US012635017B2

(12) United States Patent
Lu et al.

(10) Patent No.: US 12,635,017 B2
(45) Date of Patent: May 19, 2026

(54) WIRELESS COMMUNICATION METHOD, AP DEVICE, AND STA DEVICE

(71) Applicant: GUANGDONG OPPO MOBILE TELECOMMUNICATIONS CORP., LTD., Dongguan (CN)

(72) Inventors: Liuming Lu, Dongguan (CN); Lei Huang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/291,888

(22) Filed: Aug. 6, 2025

(65) Prior Publication Data

US 2025/0365794 A1     Nov. 27, 2025

Related U.S. Application Data

(63) Continuation of application No. 18/674,012, filed on May 24, 2024, which is a continuation of application No. PCT/CN2021/133262, filed on Nov. 25, 2021.

(51) Int. Cl.
*H04L 47/2483*     (2022.01)
*H04W 76/15*     (2018.01)

(52) U.S. Cl.
CPC ......... *H04W 76/15* (2018.02); *H04L 47/2483* (2013.01)

(58) Field of Classification Search
CPC ..... H04L 47/10; H04L 47/24; H04L 47/2483; H04W 76/00; H04W 76/10; H04W 76/11;

(Continued)

(56) References Cited

U.S. PATENT DOCUMENTS

2021/0014776 A1     1/2021  Patil et al.
2023/0164859 A1     5/2023  Jang et al.

FOREIGN PATENT DOCUMENTS

WO     2021011426 A1     1/2021
WO     2021141449 A1     7/2021
WO     2021187858 A1     9/2021

OTHER PUBLICATIONS

"IEEE P802.11be™/D1.2, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT)", dated Sep. 2021. 735 pages.

(Continued)

*Primary Examiner* — Matthew W Genack
(74) *Attorney, Agent, or Firm* — Sheppard, Mullin, Richter & Hampton LLP

(57)     ABSTRACT

The present disclosure provides a wireless communication method, applied in a first STAtion (STA) affiliated with a non-AP Multi-Link Device (MLD). The wireless communication method includes: receiving a first frame from a first Access Point (AP) affiliated with an AP Multi-Link Device (MLD), the first frame indicating that the AP MLD supports a mode, in which at least two links belonging to the AP MLD comprises a primary link and a nonprimary link, and the first frame further indicating a first link and a second link of the at least two links as the primary link for transmitting Beacon and Probe Response frames and the nonprimary link, respectively; transmitting a fourth frame to the first AP; and receiving a fifth frame from the first AP.

15 Claims, 8 Drawing Sheets

(58) Field of Classification Search
    CPC ..... H04W 76/15; H04W 76/16; H04W 76/18;
                                              H04W 76/19
    See application file for complete search history.

(56)                    References Cited

OTHER PUBLICATIONS

Jiang, "Operation with Non-STR AP", doc.: IEEE 802.11-20/755r1,
1.11-20-0755-01-00be-non-str-ap-operation.pptx, Apple Inc., dated
May 15, 2020. 12 pages.
WIPO, International Search Report and Written Opinion for Inter-
national Application No. PCT/CN2021/133262, Jun. 30, 2022.10
pages.
Asterjadhi (Qualcomm Inc), "MAC-CR to MR Comments", IEEE
Draft; 11-21-0915-00-00BE-MAC-CR-TO-MR-Comments, IEEE-
SA Mentor, Piscataway, NJ USA 802.11 EHT; 802.11be, Jul. 14,
2021, pp. 1-52, XP068182489. 52 pages.
The extended European search report issued in corresponding
European application No. 21965146.0 dated Nov. 22, 2024. 159
pages.
Examination report issued in corresponding EP application No.
21965146.0 dated Jul. 22, 2025. 10 pages.
Notice of reasons for refusal issued in corresponding JP application
No. 2024-531142 dated Jun. 20, 2025. 6 pages with English
translation.

<u>100</u>

110

120

120

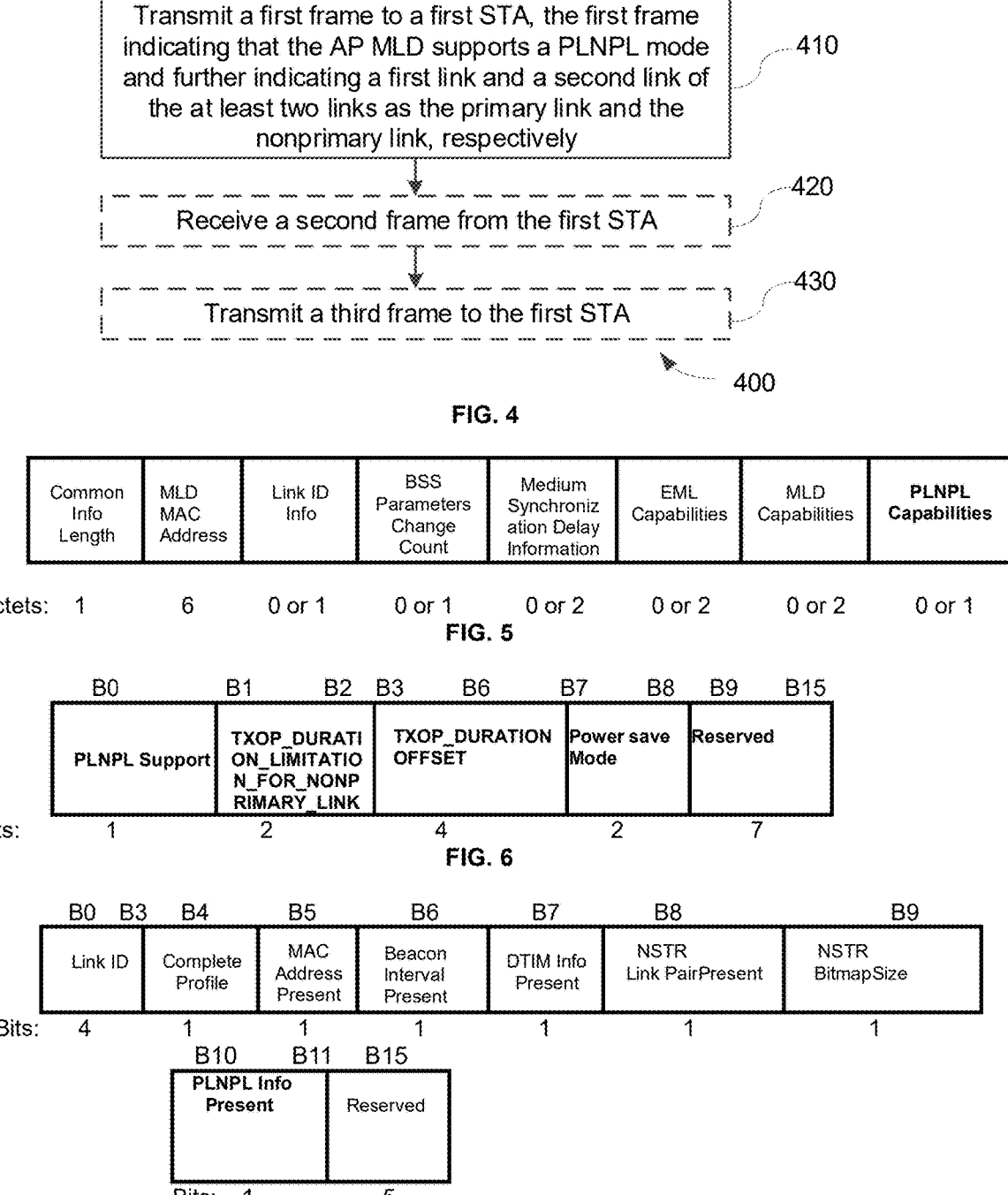

Transmit a first frame to a first STA, the first frame indicating that the AP MLD supports a PLNPL mode and further indicating a first link and a second link of the at least two links as the primary link and the nonprimary link, respectively    410

Receive a second frame from the first STA    420

Transmit a third frame to the first STA    430

| Common Info Length | MLD MAC Address | Link ID Info | BSS Parameters Change Count | Medium Synchroniz ation Delay Information | EML Capabilities | MLD Capabilities | PLNPL Capabilities |
|---|---|---|---|---|---|---|---|

Octets: 1      6      0 or 1      0 or 1      0 or 2      0 or 2      0 or 2      0 or 1

| PLNPL Support | TXOP_DURATI ON_LIMITATIO N_FOR_NONP RIMARY_LINK | TXOP_DURATION OFFSET | Power save Mode | Reserved |
|---|---|---|---|---|

Bits:      1              2              4              2              7

| Link ID | Complete Profile | MAC Address Present | Beacon Interval Present | DTIM Info Present | NSTR Link PairPresent | NSTR BitmapSize |
|---|---|---|---|---|---|---|

Bits:      4          1          1          1          1          1              1

B10          B11  B15

| PLNPL Info Present | Reserved |
|---|---|

Bits:  1              5

FIG. 7

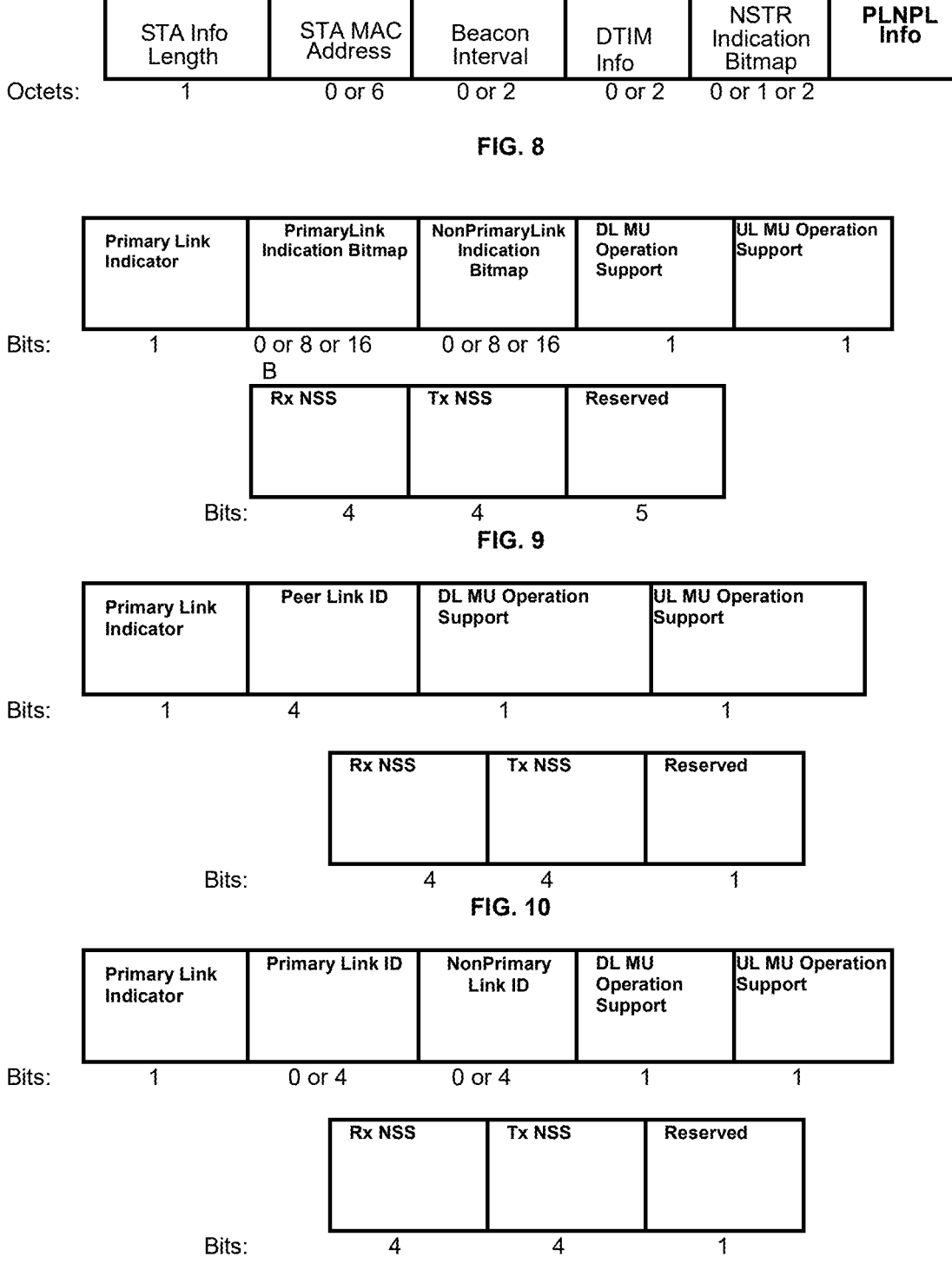

| STA Info Length | STA MAC Address | Beacon Interval | DTIM Info | NSTR Indication Bitmap | PLNPL Info |
|---|---|---|---|---|---|
| Octets: 1 | 0 or 6 | 0 or 2 | 0 or 2 | 0 or 1 or 2 | |

FIG. 8

| Primary Link Indicator | PrimaryLink Indication Bitmap | NonPrimaryLink Indication Bitmap | DL MU Operation Support | UL MU Operation Support |
|---|---|---|---|---|
| Bits: 1 | 0 or 8 or 16 | 0 or 8 or 16 | 1 | 1 |

B

| Rx NSS | Tx NSS | Reserved |
|---|---|---|
| Bits: 4 | 4 | 5 |

FIG. 9

| Primary Link Indicator | Peer Link ID | DL MU Operation Support | UL MU Operation Support |
|---|---|---|---|
| Bits: 1 | 4 | 1 | 1 |

| Rx NSS | Tx NSS | Reserved |
|---|---|---|
| Bits: 4 | 4 | 1 |

FIG. 10

| Primary Link Indicator | Primary Link ID | NonPrimary Link ID | DL MU Operation Support | UL MU Operation Support |
|---|---|---|---|---|
| Bits: 1 | 0 or 4 | 0 or 4 | 1 | 1 |

| Rx NSS | Tx NSS | Reserved |
|---|---|---|
| Bits: 4 | 4 | 1 |

FIG. 11

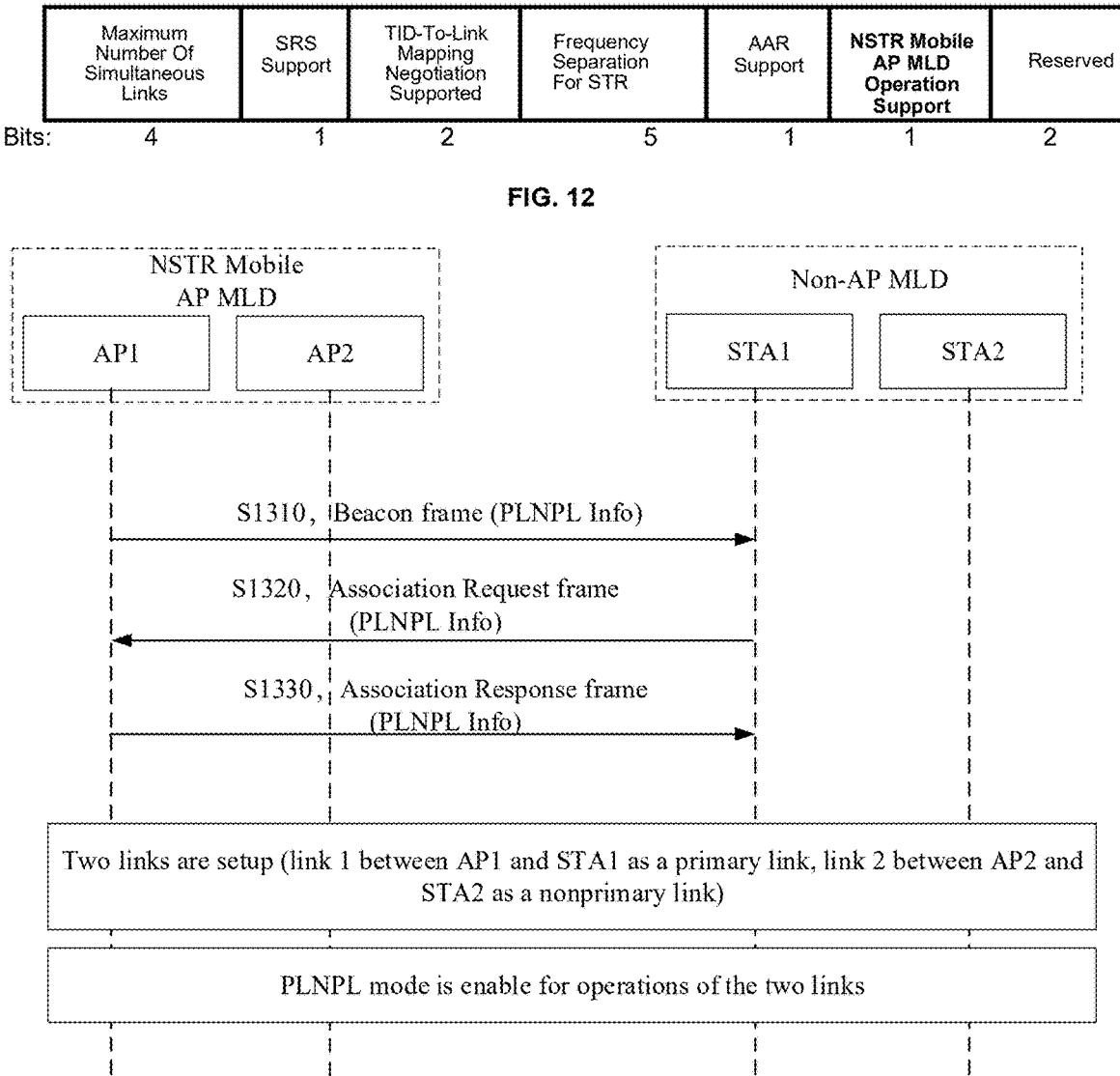

| Maximum Number Of Simultaneous Links | SRS Support | TID-To-Link Mapping Negotiation Supported | Frequency Separation For STR | AAR Support | NSTR Mobile AP MLD Operation Support | Reserved |
|---|---|---|---|---|---|---|
| Bits: 4 | 1 | 2 | 5 | 1 | 1 | 2 |

FIG. 12

NSTR Mobile AP MLD

| AP1 | AP2 |

Non-AP MLD

| STA1 | STA2 |

S1310, Beacon frame (PLNPL Info)

S1320, Association Request frame (PLNPL Info)

S1330, Association Response frame (PLNPL Info)

Two links are setup (link 1 between AP1 and STA1 as a primary link, link 2 between AP2 and STA2 as a nonprimary link)

PLNPL mode is enable for operations of the two links

Link 1     Link 2     Link 1     Link 2

FIG. 13

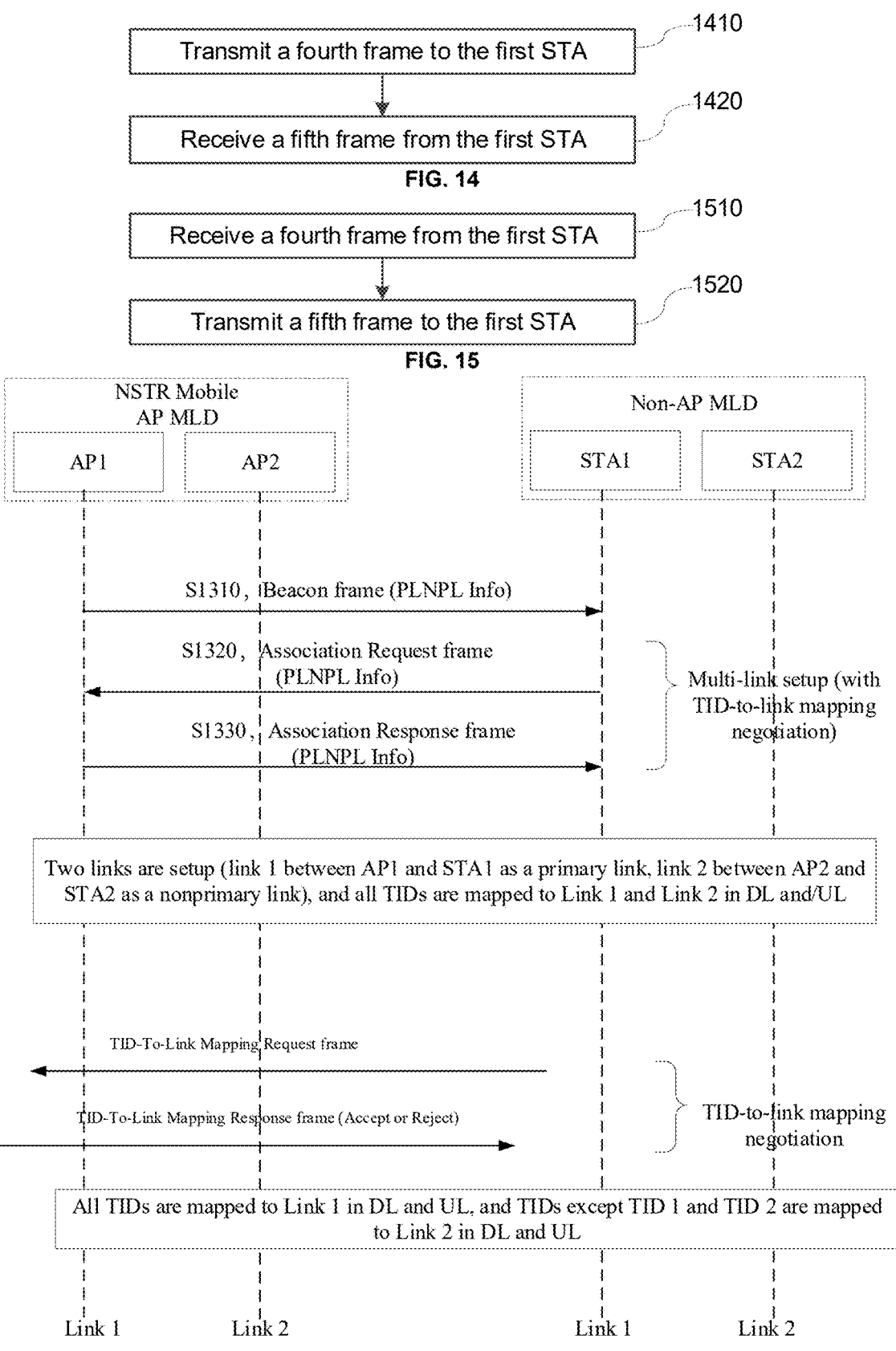

1410
Transmit a fourth frame to the first STA

1420
Receive a fifth frame from the first STA

FIG. 14

1510
Receive a fourth frame from the first STA

1520
Transmit a fifth frame to the first STA

FIG. 15

NSTR Mobile
AP MLD

AP1     AP2

Non-AP MLD

STA1     STA2

S1310, Beacon frame (PLNPL Info)

S1320, Association Request frame
(PLNPL Info)

S1330, Association Response frame
(PLNPL Info)

Multi-link setup (with
TID-to-link mapping
negotiation)

Two links are setup (link 1 between AP1 and STA1 as a primary link, link 2 between AP2 and
STA2 as a nonprimary link), and all TIDs are mapped to Link 1 and Link 2 in DL and/UL TID-To-Link Mapping Request frame TID-To-Link Mapping Response frame (Accept or Reject)

TID-to-link mapping
negotiation

All TIDs are mapped to Link 1 in DL and UL, and TIDs except TID 1 and TID 2 are mapped
to Link 2 in DL and UL Link 1     Link 2          Link 1     Link 2

FIG. 16

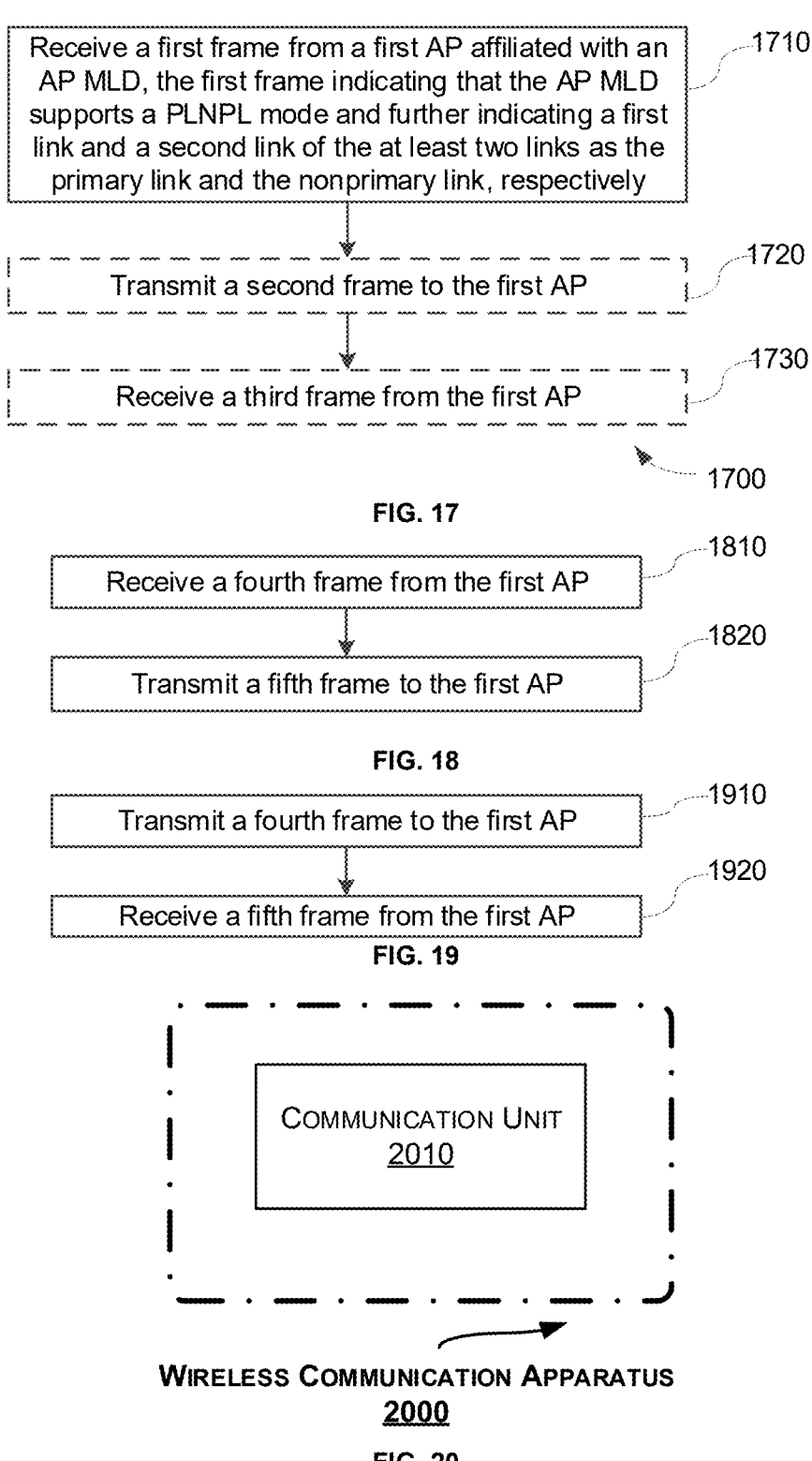

Receive a first frame from a first AP affiliated with an AP MLD, the first frame indicating that the AP MLD supports a PLNPL mode and further indicating a first link and a second link of the at least two links as the primary link and the nonprimary link, respectively —1710

Transmit a second frame to the first AP —1720

Receive a third frame from the first AP —1730

Receive a fourth frame from the first AP —1810

Transmit a fifth frame to the first AP —1820

FIG. 18

Transmit a fourth frame to the first AP —1910

Receive a fifth frame from the first AP —1920

FIG. 19

COMMUNICATION UNIT
2010

WIRELESS COMMUNICATION APPARATUS
2000

FIG. 20

WIRELESS COMMUNICATION APPARATUS
2100

COMMUNICATION DEVICE
2200

APPARATUS
2300

WIRELESS COMMUNICATION METHOD, AP DEVICE, AND STA DEVICE

CROSS REFERENCE TO RELATED APPLICATION(S)

This application is a continuation of U.S. Non-provisional application Ser. No. 18/674,012, filed May 24, 2024, which is a continuation of International Application No. PCT/CN2021/133262, filed Nov. 25, 2021, the entire disclosures of which are incorporated herein by reference.

TECHNICAL FIELD

The present disclosure relates to communication technology, and more particularly, to a wireless communication method, an Access Point (AP) device, and a STation (STA) device.

BACKGROUND

According to the related art, a NonSimultaneous Transmit and Receive (NSTR) mobile Access Point (AP) Multi-Link Device (MLD) operation has been specified as follows.

1) An NSTR mobile AP MLD is an AP MLD which sets dot11SoftAPMLDImplemented to true and has one NSTR pair of links with the following restrictions:
   Each AP affiliated with a mobile AP MLD is not required to support all the Extremely High Throughput (EHT) AP mandatory features
   Support of Multi-User (MU) operation is optional for the APs affiliated with a mobile AP MLD
   Support of two or more spatial streams is optional for the APs affiliated with a mobile AP MLD
   Only one AP of the affiliated APs operating in an NSTR pair of links sends Beacon and Probe Response frames
   The mobile AP MLD is in a mobile device that is typically battery powered
   Each AP affiliated to a mobile AP MLD has different Medium Access Control (MAC) address
2) An NSTR mobile AP MLD shall designate one link of an NSTR link pair as the primary link to transmit Beacon and Probe Response frames. The other link of the NSTR link pair is the nonprimary link.

At least the following problems need to be addressed about multi-link setup and related operations for such AP MLD:
   Mechanism to discover the NSTR Mobile AP MLD;
   Mechanism of multi-link setup between an NSTR Mobile AP MLD and a non-AP MLD which intends to be associated with the AP MLD;
   How does the STAtion (STA) learn the full information of the other link (since no beacons are sent in the other link); and
   What about Traffic IDentifier (TID)-to-link mapping negotiation for the NSTR Mobile AP MLD for transmission, as the transmission on the nonprimary link is possible only when the transmission happened on the primary link.

SUMMARY

According to a first aspect of the present disclosure, a wireless communication method is provided. The wireless communication method is applied in a first station (STA) affiliated with a non-AP MLD, and includes: receiving a first frame from a first AP affiliated with an AP MLD when the AP MLD sets dot11SoftAPMLDImplemented to true and has one NSTR pair of links with the following restrictions: each AP affiliated with a mobile AP MLD is not required to support all Extremely High Throughput (EHT) AP mandatory features; support of Multi-User (MU) operation is optional for APs affiliated with a mobile AP MLD; support of two or more spatial streams is optional for APs affiliated with a mobile AP MLD; only one AP of affiliated APs operating in an NSTR pair of links sends Beacon and Probe Response frames; the mobile AP MLD is in a mobile device that is typically battery powered; each AP affiliated to a mobile AP MLD has different medium access control (MAC) address. The first frame indicates that the AP MLD supports a mode, in which at least two links belonging to the AP MLD includes a primary link and a nonprimary link. The first frame further indicates a first link and a second link of the at least two links as the primary link for transmitting Beacon and Probe Response frames and the nonprimary link, respectively. The wireless communication method further includes: transmitting a fourth frame to the first AP, the fourth frame comprising a request for requesting one or more Traffic Identifiers (TIDs) which have been mapped to the primary link in downlink (DL) and/or in uplink (UL) or are also requested to be mapped to the primary link in DL and/or in UL, to be mapped to the nonprimary link in DL and/or in UL, and receiving a fifth frame from the first AP, the fifth frame indicating that the request is accepted; or transmitting a fourth frame to the first AP, the fourth frame comprising a request for requesting one or more Traffic Identifiers (TIDs) which have not been mapped to the primary link in downlink (DL) and/or in uplink (UL) or are not requested to be mapped to the primary link in DL and/or in UL, to be mapped to the nonprimary link in DL and/or in UL, and receiving a fifth frame from the first AP, the fifth frame indicating that the request is rejected According to a second aspect of the present disclosure, an AP device affiliated with an AP Multi-Link Device (MLD) is provided. The AP device includes: a transceiver; a memory having a computer program stored thereon; and a processor configured to invoke and run the computer program to control the transceiver to: when the AP MLD sets dot11SoftAPMLDImplemented to true and has one NSTR pair of links with the following restrictions: each AP affiliated with a mobile AP MLD is not required to support all Extremely High Throughput (EHT) AP mandatory features; support of Multi-User (MU) operation is optional for APs affiliated with a mobile AP MLD; support of two or more spatial streams is optional for APs affiliated with a mobile AP MLD; only one AP of affiliated APs operating in an NSTR pair of links sends Beacon and Probe Response frames; the mobile AP MLD is in a mobile device that is typically battery powered; each AP affiliated to a mobile AP MLD has different medium access control (MAC) address, transmit a first frame to a first station (STA) affiliated with a non-AP MLD, the first frame indicating that the AP MLD supports a mode, in which at least two links belonging to the AP MLD comprises a primary link and a nonprimary link, and the first frame further indicating a first link and a second link of the at least two links as the primary link for transmitting Beacon and Probe Response frames and the nonprimary link, respectively. The processor is further configured to control the transceiver to: receive a fourth frame from the first STA, the fourth frame comprising a request for requesting one or more Traffic Identifiers (TIDs) which have been mapped to the primary link in downlink (DL) and/or in uplink (UL) or are also requested to be mapped to the primary link in DL and/or in UL, to be mapped to the nonprimary link in DL and/or in UL, and transmitting a fifth frame to the first STA, the fifth frame indicating that the request is accepted; or receive a fourth frame from the first STA, the fourth frame comprising a request for requesting one or more Traffic Identifiers (TIDs) which have not been mapped to the primary link in downlink (DL) and/or in uplink (UL) or are not requested to be mapped to the primary link in DL and/or in UL, to be mapped to the nonprimary link in DL and/or in UL, and transmitting a fifth frame to the first STA, the fifth frame indicating that the request is rejected According to a third aspect of the present disclosure, a STA device affiliated with a non-AP Multi-Link Device (MLD) is provided. The STA device includes: a transceiver; a memory having a computer program stored thereon; and a processor configured to invoke and run the computer program to control the transceiver to: when the AP MLD sets dot11SoftAPMLDImplemented to true and has one NSTR pair of links with the following restrictions: each AP affiliated with a mobile AP MLD is not required to support all Extremely High Throughput (EHT) AP mandatory features; support of Multi-User (MU) operation is optional for APs affiliated with a mobile AP MLD; support of two or more spatial streams is optional for APs affiliated with a mobile AP MLD; only one AP of affiliated APs operating in an NSTR pair of links sends Beacon and Probe Response frames; the mobile AP MLD is in a mobile device that is typically battery powered; each AP affiliated to a mobile AP MLD has different medium access control (MAC) address, receive a first frame from a first Access Point (AP) affiliated with an AP Multi-Link Device (MLD), the first frame indicating that the AP MLD supports a mode, in which at least two links belonging to the AP MLD comprises a primary link and a nonprimary link, and the first frame further indicating a first link and a second link of the at least two links as the primary link for transmitting Beacon and Probe Response frames and the nonprimary link, respectively. The processor is configured to control the transceiver to: transmit a fourth frame to the first AP, the fourth frame comprising a request for requesting one or more Traffic Identifiers, TIDs, which have been mapped to the primary link in downlink, DL, and/or in uplink, UL, or are also requested to be mapped to the primary link in DL and/or in UL, to be mapped to the nonprimary link in DL and/or in UL, and receiving a fifth frame from the first AP, the fifth frame indicating that the request is accepted; or transmit a fourth frame to the first AP, the fourth frame comprising a request for requesting one or more Traffic Identifiers, TIDs, which have not been mapped to the primary link in downlink, DL, and/or in uplink, UL, or are not requested to be mapped to the primary link in DL and/or in UL, to be mapped to the nonprimary link in DL and/or in UL, and receiving a fifth frame from the first AP, the fifth frame indicating that the request is rejected

BRIEF DESCRIPTION OF THE DRAWINGS

The above and other objects, features and advantages will be more apparent from the following description of embodiments with reference to the figures, in which:

FIG. 4 is a flowchart illustrating a wireless communication method 400 according to embodiments of the present disclosure;

FIG. 5 illustrates addition of the PLNPL Capabilities subfield in the Common Info field of the Basic Multi-Link element of FIG. 3 according to an embodiment of the present disclosure;

FIG. 6 illustrates an exemplary format of the PLNPL Capabilities subfield according to an embodiment of the present disclosure;

FIG. 7 illustrates addition of the PLNPL Info Present subfield in the STA Control field in the Link Info field of the Basic Multi-Link element of FIG. 3 according to an embodiment of the present disclosure;

FIG. 8 illustrates addition of the PLNPL Info subfield in the STA Info field in the Link Info field of the Basic Multi-Link element of FIG. 3 according to an embodiment of the present disclosure;

FIG. 9 illustrates a first format of the PLNPL Info subfield (PLNPL Info subfield format-1) according to an embodiment of the present disclosure;

FIG. 10 illustrates a second format of the PLNPL Info subfield (PLNPL Info subfield format-2) according to an embodiment of the present disclosure;

FIG. 11 illustrates a third format of the PLNPL Info subfield (PLNPL Info subfield format-3) according to an embodiment of the present disclosure;

FIG. 12 illustrates addition of the NSTR Mobile AP MLD Operation Support subfield in the MLD Capabilities subfield in the Common Info field of the Basic Multi-Link element of FIG. 3 according to an embodiment of the present disclosure;

FIG. 13 illustrates a flowchart illustrating multi-link setup between an NSTR mobile AP MLD and a non-AP MLD according to an embodiment of the present disclosure;

FIG. 14 illustrates a TID-TO-Link mapping negotiation procedure of the wireless communication method 400 according to an embodiment of the present disclosure;

FIG. 15 illustrates another TID-TO-Link mapping negotiation procedure of the wireless communication method 400 according to an embodiment of the present disclosure;

FIG. 16 illustrates two exemplary TID-to-link mapping negotiation procedures for a NSTR Mobile AP MLD according to embodiments of the present disclosure;

FIG. 17 is a flowchart illustrating a wireless communication method 1700 according to embodiments of the present disclosure;

FIG. 18 illustrates a TID-TO-Link mapping negotiation procedure of the wireless communication method 400 according to an embodiment of the present disclosure;

FIG. 19 illustrates another TID-TO-Link mapping negotiation procedure of the wireless communication method 400 according to an embodiment of the present disclosure;

FIG. 20 is a block diagram of a wireless communication apparatus 2000 according to an embodiment of the present disclosure;

DETAILED DESCRIPTION

Hereinafter, the present disclosure will be described with reference to embodiments shown in the attached drawings.

However, it is to be understood that those descriptions are just provided for illustrative purpose, rather than limiting the present disclosure. Further, in the following, descriptions of known structures and techniques are omitted so as not to unnecessarily obscure the concept of the present disclosure.

Various embodiments of the present disclosure can be applied to wireless local area network (WLAN) standards, such as the IEEE 802.11 standards including the IEEE 802.11ax specification and the IEEE 802.11be specification, and/or any other appropriate wireless communication standard, such as the Worldwide Interoperability for Microwave Access (WiMAX), Bluetooth, and/or ZigBee standards, and/or any other protocols either currently known or to be developed in the future. The WLAN may include a plurality of Basic Service Sets (BSS), and network nodes in a basic service set are STAtions (STAs). STAs may include Access Point STAs (AP STAs) and non-AP STAs, and each BSS may include one AP STA and a plurality of non-AP STAs associated with the AP. Another version is that STAs include a STA and a peer STA that is in peer to peer communication with the STA. In this case, the peer STA may be an AP STA or a non-AP STA.

The 802.11 communication system may perform communications between an AP STA and a non-AP STA, and may also perform communications between non-AP STAs.

The AP STA (also named as AP for the sake of simplification) is also known as a wireless access point, a hot spot, or the like. The AP is an access point for a mobile user to access a wired network, and is mainly deployed at home, or inside a building or a campus, with a coverage radius typically of tens to hundreds of meters. Certainly, the AP may alternatively be deployed outdoors. An AP is equivalent to a bridge that connects a wired network and a wireless network. A main function of the AP is to connect wireless network clients together and then connect the wireless network to Ethernet. An AP device may be a terminal device (e.g., a mobile phone) or a network device (e.g., a router) with a Wireless Fidelity (Wireless Fidelity, Wi-Fi) chip.

A non-AP STA (also named as STA for the sake of simplification) may be a mobile phone, a tablet computer (pad), a computer with a wireless transceiving function, a virtual reality (VR) device, an augmented reality (AR) device, a wireless device in industrial control, a Set Top Box (STB), a wireless device in self-driving, a vehicle-mounted communication device, a wireless device in remote medical, a wireless device in smart grid, a wireless device in transportation safety, a wireless device in smart city, a wireless device in smart home, and the like.

Figure 1:
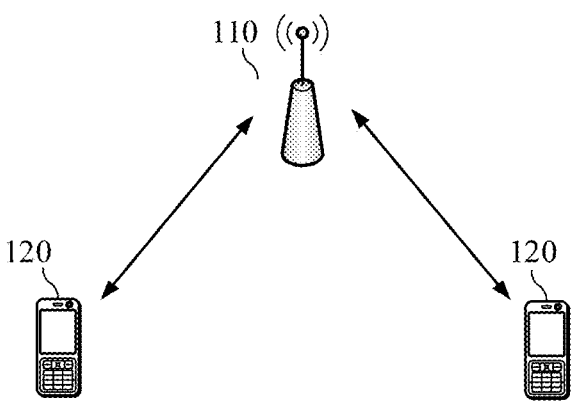
FIG. 1 illustrates a communication system 100 that the present disclosure may be applied.

FIG. 1 illustrates a communication system 100 that the present disclosure may be applied. As illustrated, the communication system 100 includes one AP and two STAs accessing the network via the AP. It should be appreciated that the communication system 100 can include a plurality of APs and STAs of a different number.

It should be noted that a device having communication functions in a network/system according to embodiments of the present disclosure may also be referred to as a communication device. For example, the communication system 100 as illustrated in FIG. 1 may include an AP 110 and STAs 120 having communication functions, and the AP 110 and the STAs 120 can be specific devices as mentioned above. The communication device may further include other devices in the communication system 100, such as a network controller, a network gateway and the other network entities, and the present disclosure is not limited thereto.

It shall be noted that a role of a single one STA may not be absolute. For example, when a STA is a mobile phone connected to a router, it may serve as a non-AP STA. But, when the mobile phone provides a hot spot for other mobile phone(s), it actually serves as an AP.

AP and non-AP STA may be devices applied in Internet of Vehicles (IOV), Internet of Things (IoT) nodes, sensors and the like in IoT, smart cameras, smart remote control, smart water meters and electricity meters in smart home, or sensors in smart city, and the like.

Embodiments of the present disclosure may be applied in a wireless communication chip, an Application Specific Integrated Circuit (ASIC), System On Chip (SOC), and the like.

As used herein, a downlink transmission refers to a transmission from an AP device to a STA device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

In order to increase network capacity while reducing network delay, Multi-Link Aggregation (MLA) technology is introduced. In a system supporting MLA, some services can be transmitted on at least two links. A device supporting MLA is a Multi-Link Device (MLD).

MLD devices may include an AP MLD and a non-AP MLD, which may also be referred to as a STA MLD.

In the embodiments of present disclosure, the AP MLD may include a plurality of APs (or multiple APs are affiliated with the AP MLD), the non-AP MLD may include a plurality of STAs (or multiple STAs are affiliated with the non-AP MLD), and multiple links may be formed between the APs in the AP MLD and the STAs in the non-AP MLD. Data communication may be achieved via a link between an AP in the AP MLD and a corresponding STA in the non-AP MLD.

Figure 2:
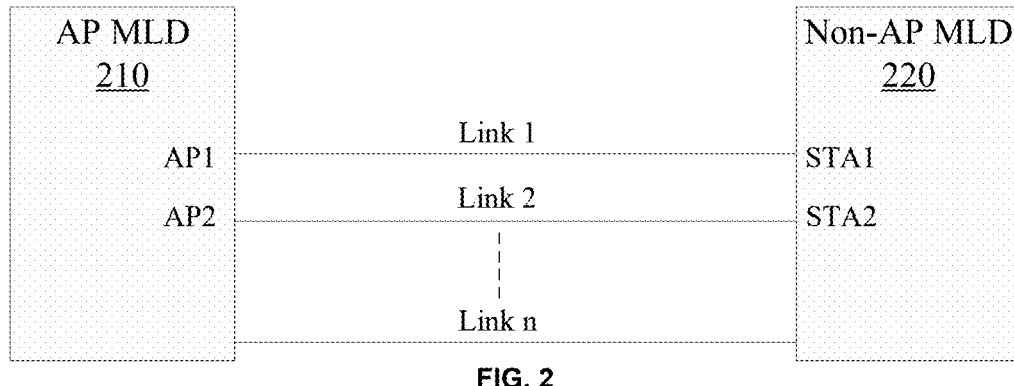
FIG. 2 illustrates a communication system 200 that the present disclosure may be applied.

FIG. 2 illustrates a communication system 200 that the present disclosure may be applied. As illustrated in FIG. 2, an AP MLD 210 may include AP1, AP2, . . . , APn, and a non-AP MLD 220 may include STA1, STA2, . . . , STAn, where n is an integer greater than 1. Link 1 is formed between AP1 and STA1, Link 2 is formed between AP2 and STA2, and so on. Data communication may be achieved between AP1 and STA1 via Link 1, between AP2 and STA2 via Link 2, and so on.

Figure 3:
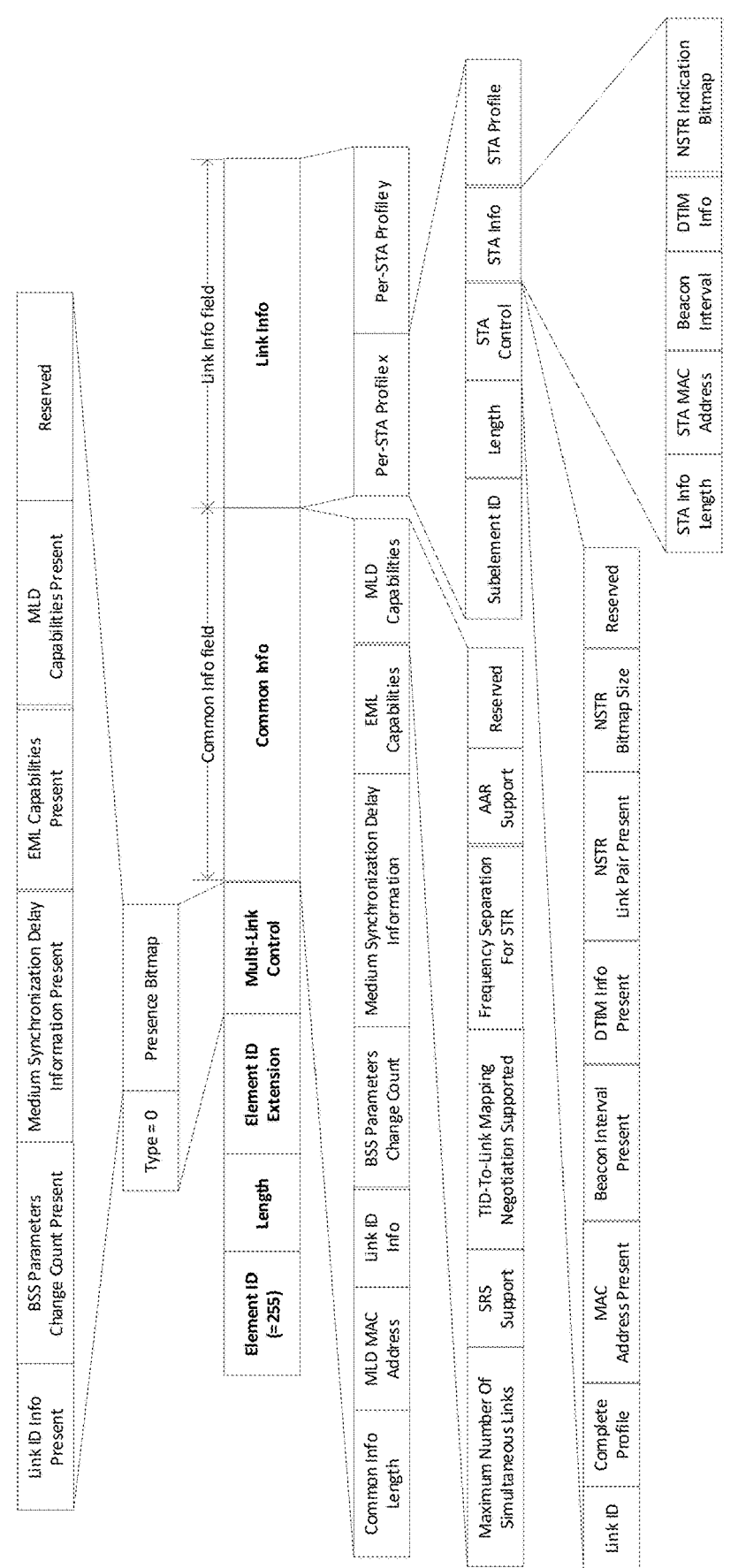
FIG. 3 illustrates a format of Basic Multi-Link element according to embodiments of the present disclosure.

FIG. 3 illustrates a format of Basic Multi-Link element according to embodiments of the present disclosure. The Basic Multi-link element is used to carry information of an MLD and its affiliated STAs during multi-link discovery and multi-link setup.

Advertisement of multi-link information in Multi-Link element has been specified in IEEE P802.11be™/D1.2 as:

An AP affiliated with an AP MLD shall follow the rules defined in 35.3.4.4 (Multi-Link element usage rules in the context of discovery) for including a Basic Multi-Link element in a Beacon frame that it transmits or in a Probe Response frame, which is not an ML probe response, that it transmits.

An AP affiliated with an AP MLD shall follow the rules in 35.3.4.2 (Use of ML probe request and response) for including a Basic Multi-Link element in a Probe Response frame, which is an ML probe response, that it transmits.

An AP affiliated with an AP MLD shall include, in a Beacon frame or a Probe Response frame, which is not an ML probe response, only the Common Info field of the Basic Multi-Link element as defined in 9.4.2.295b (Multi-Link element) unless conditions in 35.3.10 (Multi-link general procedures) are satisfied. The Common info field of the Basic Multi-Link element carried in the Beacon frame or Probe Response frame shall include the MLD MAC address subfield for the AP MLD with which the AP is affiliated include the Link ID Info subfield for the AP by setting the Link ID Info Present subfield of the Multi-Link Control field of the Basic Multi-Link element to 1 include the BSS Parameters Change Count subfield for the AP by setting the BSS Parameters Change Count Discovery of an AP MLD has been specified in IEEE P802.11be™/D1.2 as:

An ML probe request is a Probe Request frame that is sent outside the context of active scanning that is used to discover an AP:

with the Address 1 field set to the broadcast address and the Address 3 field set to the BSSID of an AP, or with the Address 1 field set to the BSSID of an AP's BSS.

with the MLD ID subfield (if present) set to the MLD ID that identifies the targeted AP MLD with which the requested AP(s) are affiliated.

and that includes a Probe Request Multi-Link element defined in 9.4.2.295b.3 (Probe Request Multi-Link element).

An ML probe response is a Probe Response frame:

that is transmitted in response to receiving an ML probe request and that includes Basic Multi-Link element which can carry complete or partial per-STA profile(s), based on the soliciting request, for each of the requested AP(s) of the targeted AP MLD.

Multi-link (re) setup has been specified in IEEE P802.11be™/D1.2 as:

For a non-AP MLD to perform multi-link (re) setup with an AP MLD, the non-AP MLD and the AP MLD shall exchange (Re) Association Request/Response frames and shall follow the MLD (re) association procedure as described in 11.3 (STA Authentication and association). A (Re) Association Request/Response frame exchange that results in a successful association is for a multi-link setup if both the frames carried Basic Multi-Link element. Otherwise the association is not for a multi-link setup.

In the (Re) Association Request frame, the non-AP MLD indicates the links that are requested for (re) setup and the capabilities and operational parameters of the requested links as described in 35.3.5.4 (Usage and rules of Basic Multi-Link element in the context of multi-link (re) setup). The non-AP MLD may request to (re) setup links with a subset of APs affiliated with the AP MLD.

NOTE—The links that are requested for resetup and the capability and operation parameters of each link that are requested for resetup are independent of the existing setup links with an associated AP MLD and the capability and operation parameters of each setup link with an associated AP MLD.

In the (Re) Association Response frame, the AP MLD indicates the links that are accepted for (re) setup and the capabilities and operational parameters of the accepted links as described in 35.3.5.4 (Usage and rules of Basic Multi-Link element in the context of multi-link (re) setup). The AP MLD may not accept all the links that are requested for (re) setup. The (Re) Association Response frame shall be sent to the non-AP STA affiliated with the non-AP MLD that sent the (Re) Association Request frame.

In view of the above, the present disclosure specifies a Primary Link and Nonprimary Link (PLNPL) mode for solving the problems existing in the current multi-link setup and operation for an AP MLD such as a NSTR mobile AP MLD.

To be specific, taking the scenario as illustrated in FIG. 2 as an example for sake of explanation, when the non-AP MLD 220 is operating in the PLNPL mode with the AP MLD 210 supporting the PLNPL mode with which the non-AP MLD 220 is associated, any of following applies:

(1) For at least one link pair of the non-AP MLD 220, Link 1 and Link 2 belonging to the link pair, which can be, e.g., a Simultaneous Transmit and Receive (STR) or NSTR link pair, have been successfully set up between the non-AP MLD 220 and the AP MLD 210, and Link 1 is designated as a primary link and Link 2 is designated as a nonprimary link during multi-link setup.

(2) The setup of the link between STA2 affiliated with the non-AP MLD 220 and AP2 in the nonprimary link (e.g., Link 2) is performed by exchange of management frames between STA1 affiliated with the non-AP MLD 220 and AP1 affiliated with the AP MLD 210 in the primary link.

(3) STA2 in the nonprimary link acquires information of complete or partial profile of AP2 from specific management frames, which are transmitted by AP1 in the primary link. STA1 receives the specific management frames from AP1 and then provide them to STA2.

(4) STA1 and STA2 affiliated with the non-AP MLD 220 that is associated with the AP MLD 210 follows the procedure of start time sync Physical layer Protocol Data Units (PPDUs) medium access when intending to transmit in the nonprimary link with the following additional constraints.

STA2 may initiate a PPDU transmission to AP2 in the nonprimary link only if STA1 in the primary link is also initiating the PPDU as a transmission opportunity (TXOP) holder with the same start time.

Similarly, taking the scenario as illustrated in FIG. 2 for sake of explanation, when the AP MLD 210 is operating in the PLNPL mode with the non-AP MLD 220 supporting the PLNPL mode, which is associated with the AP MLD 210, the following applies:

(1) For at least one link pair of the AP MLD 210, Link 1 and Link 2 belonging to the link pair have been successfully set up between the AP MLD 210 and the non-AP MLD 220, and Link 1 is designated as a primary link and Link 2 is designated as a nonprimary link during the multi-link setup.

(2) The setup of the link between STA2 and AP2 in the nonprimary link is performed by exchange of management frames between STA1 and AP1 in the primary link.

(3) Only AP1 sends Beacon and Probe Response frames, while AP2 doesn't send Beacon and Probe Response frames.

(4) The information of complete or partial profile of AP2 is carried by specific management frames, which are transmitted by AP1 in the primary link. STA1 receives the specific management frames from AP1 and then provide them to STA2.

(5) APs (AP1 and AP2) affiliated with the AP MLD 210 follow the procedure of start time sync PPDUs medium access when intending to transmit in the nonprimary link with the following additional constraints.

AP2 initiates a PPDU transmission to STA2 in the nonprimary link only if AP1 is also initiating the PPDU as a TXOP holder with the same start time.

FIG. 4 is a flowchart illustrating a wireless communication method 400 according to embodiments of the present disclosure. The wireless communication method 400 can be performed at a first AP affiliated with an AP MLD supporting the PLNPL mode. For example, the wireless communication method 400 may be applied in the scenario as illustrated in FIG. 2. Then, the first AP may be AP1 and the AP MLD may be the AP MLD 210.

At block 410, the first AP transmits a first frame to a first STAtion (STA) affiliated with a non-AP MLD. The first frame indicates that the AP MLD supports a PLNPL mode, in which at least two links belonging to the AP MLD includes a primary link and a nonprimary link, and further indicates a first link and a second link of the at least two links as the primary link and the nonprimary link, respectively.

In an embodiment, the first frame may be a beacon frame or a probe response frame, and in the PLNPL mode, only the first AP transmits the beacon frame or the probe response frame, while a second AP affiliated with the AP MLD does not send any beacon frame or probe response frame.

In an embodiment, in the PLNPL mode, the first frame carries complete or partial profile of the second AP. For example, the complete or partial profile of the second STA may be carried in a Basic Multi-Link element carried in the first frame.

In an embodiment, in the PLNPL mode, a second AP affiliated with the AP MLD (e.g., AP2 as illustrated in FIG. 2) initiates a Physical layer Protocol Data Unit (PPDU) transmission to a second STA affiliated with the non-AP MLD (e.g., STA2 as illustrated in FIG. 2) in the nonprimary link only if the first AP in the primary link is also initiating the PPDU transmission as a TXOP holder with the same start time.

In an embodiment, the first frame may include a PLNPL Capabilities subfield indicating capabilities for an operation of the PLNPL mode (also referred to as a PLNPL operation). The first PLNPL Capabilities subfield contains several subfields that are used to advertise the capabilities for the PLNPL operation. For example, the first PLNPL Capabilities subfield may be contained in the Common Info field of the Basic Multi-Link element carried in the first frame, as shown in FIG. 5, which illustrates addition of the PLNPL Capabilities subfield in the Common Info field of the Basic Multi-Link element of FIG. 3 according to an embodiment of the present disclosure.

In an embodiment, the first PLNPL Capabilities subfield may include at least one of:

a PLNPL Support subfield indicating support of the PLNPL mode;

a Power Save Mode subfield indicating whether power save modes for the first AP and/or a second AP affiliated with the AP MLD are supported;

a TXOP_DURATION_LIMITATION_FOR_NONPRIMARY_LINK subfield indicating whether a duration of a TXOP gained by the second AP is only allowed to be equal to or shorter than a duration of a TXOP gained by the first AP; and a TXOP duration offset subfield indicating a maximum offset allowed between an end of the TXOP gained by the second AP and an end of the TXOP gained by the first AP.

FIG. 6 illustrates an exemplary format of the PLNPL Capabilities subfield according to an embodiment of the present disclosure. As shown, the PLNPL Capabilities subfield includes the PLNPL Support subfield, the TXOP_DURATION_LIMITATION_FOR_NONPRIMARY_LINK subfield, the TXOP DURATION OFFSET subfield and the Power save Mode subfield.

The PLNPL Support subfield indicates support of the PLNPL operation for an MLD, i.e., an AP MLD or a non-AP MLD. The PLNPL Support subfield is set to 1 if the MLD supports the PLNPL operation. Otherwise, it is set to 0.

The exemplary encoding for the TXOP_DURATION_LIMITATION_FOR_NONPRIMARY_LINK subfield is defined in Table 1 (TXOP_DURATION_LIMITATION_FOR_NONPRIMARY_LINK).

TABLE 1

| Encoding for TXOP_DURATION_LIMITATION_FOR_NONPRIMARY_LINK subfield | |
|---|---|
| Value of TXOP_DURATION_LIMITATION_FOR_NONPRIMARY_LINK subfield | Description |
| 0 | For non-AP MLD: For start time sync PPDUs medium access of STAs affiliated with a non-AP MLD that is associated with an AP MLD, the duration of the TXOP gained by a STA affiliated with the non-AP MLD in the nonprimary link is only allowed to be equal to or shorter than the duration of the TXOP gained a STA affiliated with the non-AP MLD in the primary link. |

TABLE 1-continued

| Encoding for TXOP_DURATION_LIMITATION_FOR_NONPRIMARY_LINK subfield | |
| --- | --- |
| Value of TXOP_DURATION_LIMITATION_FOR_NONPRIMARY_LINK subfield | Description |
| 1 | For AP MLD: For start time sync PPDUs medium access of APs affiliated with an AP MLD, the duration of the TXOP gained by an AP affiliated with the AP MLD in the nonprimary link is only allowed to be equal to or shorter than the duration of the TXOP gained an AP affiliated with the AP MLD in the primary link. For non-AP MLD: For start time sync PPDUs medium access of STAs affiliated with a non-AP MLD that is associated with an AP MLD, the duration of the TXOP gained by a STA affiliated with the non-AP MLD in the nonprimary link is only allowed to be equal to the duration of the TXOP gained a STA affiliated with the non-AP MLD in the primary link. |
| 2 | For AP MLD: For start time sync PPDUs medium access of APs affiliated with an AP MLD, the duration of the TXOP gained by an AP affiliated with the AP MLD in the nonprimary link is only allowed to be equal to the duration of the TXOP gained an AP affiliated with the AP MLD in the primary link. For non-AP MLD: For start time sync PPDUs medium access of STAs affiliated with a non-AP MLD that is associated with an AP MLD, the duration of the TXOP gained by a STA affiliated with the non-AP MLD in the nonprimary link is only allowed to be equal to or shorter than the duration of the TXOP gained a STA affiliated with the non-AP MLD in the primary link plus TXOP_DURATION_OFFSET. For AP MLD: For start time sync PPDUs medium access of APs affiliated with an AP MLD, the duration of the TXOP gained by an AP affiliated with the AP MLD in the nonprimary link is only allowed to be equal to or shorter than the duration of the TXOP gained an AP affiliated with the AP MLD in the primary link plus TXOP_DURATION_OFFSET. |
| 3 | Reserved |

The TXOP DURATION OFFSET subfield may indicate a maximum offset allowed between an end of a TXOP gained by the second AP in the nonprimary link and an end of a TXOP gained by the first AP in the primary link for start time sync PPDUs medium access of APs affiliated with the AP MLD, such as an NSTR mobile AP MLD.

The Power save Mode subfield indicates whether power save modes for the first AP and/or the second AP are supported in the PLNPL mode. Table 2 shows exemplary encoding for the Power save Mode subfield.

TABLE 2

| Encoding for Power save Mode subfield | |
| --- | --- |
| Value of Power save Mode subfield | Description |
| 0 | The power save modes for APs affiliated with the NSTR AP MLD in the primary link and nonprimary link are supported; |
| 1 | The power save mode for AP affiliated with the NSTR AP MLD in the primary link is supported; The power save mode for AP affiliated with the NSTR AP MLD in the nonprimary link is not supported |
| 2 | The power save modes for APs affiliated with the NSTR AP MLD in the primary link and nonprimary link are not supported; |
| 3 | Reserved |

In an embodiment, the first frame may include link identifier information for the primary link and link identifier information for the nonprimary link.

For example, the first frame may include a PLNPL Info subfield for indicating the link identifier information for the primary link and the link identifier information for the nonprimary link, and a PLNPL Info Present subfield indicates the presence of the PLNPL Info subfield.

In an embodiment, the first frame may further indicate at least one of: support of an UpLink (UL) Multi-User (MU) operation for the first AP; and support of a DownLink (DL) MU operation for the first AP, e.g., by the PLNPL Info subfield.

The PLNPL Info Present subfield may be contained in the STA Control field in the Link Info field of the Basic Multi-Link element, as shown in FIG. 7, which illustrates addition of the PLNPL Info Present subfield in the STA Control field in the Link Info field of the Basic Multi-Link element of FIG. 3 according to an embodiment of the present disclosure.

The PLNPL Info subfield may be contained in the STA Info field in the Link Info field of the Basic Multi-Link element of FIG. 3, as shown in FIG. 8, which illustrates addition of the PLNPL Info subfield in the STA Info field in the Link Info field of the Basic Multi-Link element of FIG. 3 according to an embodiment of the present disclosure.

The PLNPL Info Present subfield indicates presence of the PLNPL Info subfield in the STA Info field and is set to 1 if the PLNPL Info subfield is present in the STA Info field; otherwise it is set to 0. If a link identified by the Link ID subfield of the STA Control field is neither a primary link nor a nonprimary link, the PLNPL Info Present subfield is set to 0.

The PLNPL Info subfield may indicate information for the nonprimary link(s) and/or primary link(s), and supported operations on the links in the PLNPL mode. For example, the PLNPL Info subfield may have three formats as shown in FIGS. 9-11, respectively.

FIG. 9 illustrates a first format of the PLNPL Info subfield (PLNPL Info subfield format-1) according to an embodiment of the present disclosure.

As shown in FIG. 9, the PLNPL Info subfield may include a Primary Link Indicator, a PrimaryLink Indication Bitmap, a NonPrimaryLink Indication Bitmap, a DL MU Operation Support subfield, a UL MU Operation Support subfield, an Rx NSS subfield, a Tx NSS subfield and a reserved subfield.

The Primary Link Indicator subfield indicates whether the link identified by the Link ID subfield of the STA Control field is the primary link or the nonprimary link of one or more link pair. The Primary Link Indicator subfield is set to 1 if the link identified by the Link ID subfield is the primary link of one or more link pair; otherwise it is set to 0 if the link identified by the Link ID subfield is the nonprimary link of one or more link pair.

If the Primary Link Indicator subfield is equal to 1, then the PLNPL Info subfield contains the NonPrimaryLink Indication Bitmap subfield and contains no PrimaryLink Indication Bitmap subfield. If the Primary Link Indicator subfield is equal to 0, then the PLNPL Info subfield contains the PrimaryLink Indication Bitmap subfield and contains no NonPrimaryLink Indication Bitmap subfield.

Each bit Bj (j≠i) in the PrimaryLink Indication Bitmap subfield included in the Per-STA Profile sub-element with Link ID subfield being i (where 0≤i<15) is set to 1 if the link with Link ID value being j is the primary link of the link pair corresponding to Link IDs being <i, j>, of which the link with Link ID value being i is the nonprimary link, and the Basic Multi-Link element contains a Per-STA Profile sub-element with Link ID value being i; otherwise it is set to 0. Bit Bi in the PrimaryLink Indication Bitmap subfield included in the Per-STA Profile sub-element with Link ID subfield value being i is reserved.

Each bit Bj (j≠i) in the NonPrimaryLink Indication Bitmap subfield included in the Per-STA Profile sub-element with Link ID subfield being i (where 0≤i<15) is set to 1 if the link with Link ID value being j is the nonprimary link of the link pair corresponding to Link IDs being <i, j>, of which the link with Link ID value being i is the primary link, and the Basic Multi-Link element contains a Per-STA Profile sub-element with Link ID value being i; otherwise it is set to 0. Bit Bi in the NonPrimaryLink Indication Bitmap subfield included in the Per-STA Profile sub-element with Link ID subfield value being i is reserved.

FIG. 10 illustrates a second format of the PLNPL Info subfield (PLNPL Info subfield format-2) according to an embodiment of the present disclosure.

As shown in FIG. 10, the PLNPL Info subfield may include a Primary Link Indicator, a Peer Link ID, a DL MU Operation Support subfield, a UL MU Operation Support subfield, an Rx NSS subfield, a Tx NSS subfield and a reserved subfield.

The Primary Link Indicator subfield indicates whether the link identified by the Link ID subfield of the STA Control field is the primary link or the nonprimary link of one link pair. The Primary Link Indicator subfield is set to 1 if the link identified by the Link ID subfield of the STA Control field is the primary link of one link pair; otherwise it is set to 0 if the link identified by the Link ID subfield of the STA Control field is the nonprimary link of one link pair.

If the Primary Link Indicator subfield is equal to 1, then the PLNPL Info subfield contains the NonPrimary Link ID subfield and contains no Primary Link ID subfield. If the Primary Link Indicator subfield is equal to 0, then the PLNPL Info subfield contains the Primary Link ID subfield and contains no NonPrimary Link ID subfield.

The Peer Link ID subfield indicates the link identifier for the nonprimary link of the link pair which contains the link identified by the Link ID subfield of the STA Control field and the link identified by the Peer Link ID subfield if the Primary Link Indicator subfield indicates the link identified by the Link ID subfield of the STA Control field is the primary link.

The remaining subfields of PLNPL Info subfield format-2 are the same as those of PLNPL Info subfield format-1.

FIG. 11 illustrates a third format of the PLNPL Info subfield (PLNPL Info subfield format-3) according to an embodiment of the present disclosure.

As shown in FIG. 11, the PLNPL Info subfield may include a Primary Link Indicator, a Primary Link ID, a NonPrimary Link ID, a DL MU Operation Support subfield, a UL MU Operation Support subfield, an Rx NSS subfield, a Tx NSS subfield and a reserved subfield.

The PLNPL Info subfield format-3 differs from the PLNPL Info subfield format-2 only in the Primary Link ID and the NonPrimary Link ID, and explanations of the same subfields will be omitted.

The Primary Link ID subfield contains the link identifier for the primary link of the link pair which contains the link identified by the Link ID subfield of the STA Control field and the link identified by the Primary Link ID subfield.

The NonPrimary Link ID subfield contains the link identifier for the nonprimary link of the link pair which contains the link identified by the Link ID subfield of the STA Control field and the link identified by the NonPrimary Link ID subfield.

Referring back to FIG. 4, as another embodiment, the wireless communication method 400 may further include steps as illustrated by blocks 420 and 430. To be specific, the first AP receives a second frame from a first STA affiliated with a non-AP MLD at block 420, and transmits a third frame to the first STA at block 430. For example, the second frame may be an Association Request frame, and the third frame may be an Association Response frame.

As an example, the second frame indicates that the non-AP MLD supports the PLNPL mode and is used for requesting the first link to be setup between the first AP and the first STA as the primary link and the second link to be setup between a second AP affiliated with the AP MLD and a second STA affiliated with the non-AP MLD as the nonprimary link, and the third frame indicates successful setup of the first link and/or the second link between the non-AP MLD and the AP MLD. In this example, the second frame may carry complete or partial profile of the second STA.

In an embodiment, when the non-AP MLD supports the PLNPL mode, the second frame carries complete or partial profile of the second STA. For example, the complete or partial profile of the second STA may be carried in a Basic Multi-Link element carried in the second frame, e.g., as illustrated in FIG. 3.

In an embodiment, at least one of the second frame and the third frame may include link identifier information for the primary link and link identifier information for the nonprimary link. For example, the second frame and/or the third frame may include the PLNPL Info subfield illustrated in FIGS. 8-11 and the PLNPL Info Present subfield as illustrated in FIG. 7.

In an embodiment, the third frame carries complete profile of the first and second APs. For example, the complete or partial profile of the second STA is carried in a Basic Multi-Link element carried in the third frame, e.g., as illustrated in FIG. 3.

As another example, the second frame indicates that the non-AP MLD supports the PLNPL mode and is used for requesting the first link to be setup between the first AP and the first STA as the primary link and the second link to be setup between a second AP affiliated with the AP MLD and a second STA affiliated with the non-AP MLD as the nonprimary link, and the third frame indicates successful setup of the first link and/or the second link between the non-AP MLD and the AP MLD.

In an embodiment, the second frame further indicates at least one of: support of a UL MU operation for the first STA; and support of a DL MU operation for the first STA. For example, a PLNPL Info subfield contained in a Link Info field of a Basic Multi-Link element carried in second frame may also indicate such information.

In an embodiment, the third frame further indicates at least one of: support of a UL MU operation for the first AP; and support of a DL MU operation for the first AP. For example, a PLNPL Info subfield contained in a Link Info field of a Basic Multi-Link element carried in the third frame may also indicate such information.

In an embodiment, the second frame may include a PLNPL Capabilities subfield indicating capabilities for the PLNPL operation, which is contained in the Common Info field of the Basic Multi-Link element, as shown in FIG. 5.

In an embodiment, the PLNPL Capabilities subfield includes at least one of:
 a PLNPL Support subfield indicating support of the PLNPL mode, e.g., as illustrated in FIG. 6;
 a Power Save Mode subfield indicating whether power save modes for the first AP and/or the second AP are supported, e.g., as defined in Table 2;
 a TXOP_DURATION_LIMITATION_FOR_NONPRI-MARY_LINK subfield indicating whether a duration of a TXOP gained by the second STA is only allowed to be equal to or shorter than a duration of a TXOP gained by the first STA, e.g., as defined in Table 1; and
 a TXOP duration offset subfield indicating a maximum offset allowed between an end of the TXOP gained by the second STA and an end of the TXOP gained by the first STA.

In an embodiment, the third frame may include a PLNPL Capabilities subfield indicating capabilities for the PLNPL operation, which is contained in the Common Info field of the Basic Multi-Link element, as shown in FIG. 5.

In an embodiment, the PLNPL Capabilities subfield may include at least one of:
 a PLNPL Support subfield indicating support of the PLNPL mode, e.g., as illustrated in FIG. 6;
 a Power Save Mode subfield indicating whether power save modes for the first AP and/or the second AP are supported, e.g., as defined in Table 2;
 a TXOP_DURATION_LIMITATION_FOR_NONPRI-MARY_LINK subfield indicating whether a duration of a TXOP gained by the second AP is only allowed to be equal to or shorter than a duration of a TXOP gained by the first AP, e.g., as defined in Table 1; and
 a TXOP duration offset subfield indicating a maximum offset allowed between an end of the TXOP gained by the second AP and an end of the TXOP gained by the first AP.

In an embodiment, the AP MLD may be a NSTR mobile AP MLD, and the first frame may further indicate support for a NSTR Mobile AP MLD operation.

For example, the first frame may include a NSTR Mobile AP MLD Operation Support subfield for indicating support for the NSTR Mobile AP MLD operation. This subfield may be contained in the Common Info field of the Basic Multi-Link element, as shown in FIG. 12, which illustrates addition of the NSTR Mobile AP MLD Operation Support subfield in the MLD Capabilities subfield in the Common Info field of the Basic Multi-Link element of FIG. 3 according to an embodiment of the present disclosure. The NSTR Mobile AP MLD Operation Support subfield may be set to 1 to indicate that the AP MLD supports to behave as an NSTR Mobile AP MLD; otherwise it is set to 0.

In another embodiment, the AP MLD may be a NSTR mobile AP MLD, and the second frame further indicates that the non-AP MLD is capable of operating with the NSTR mobile AP MLD.

For example, the second frame may also include a NSTR Mobile AP MLD Operation Support subfield as illustrated in FIG. 12 for indicating that the non-AP MLD is capable of operating with the NSTR mobile AP MLD. The NSTR Mobile AP MLD Operation Support subfield may be set to 1 to indicate that the non-AP MLD is capable of operating with an NSTR Mobile AP MLD with which it is associated, and the operation includes exchanging frames with the NSTR Mobile AP MLD in the primary link and nonprimary link; otherwise it is set to 0.

FIG. 13 illustrates a flowchart illustrating multi-link setup between an NSTR mobile AP MLD and a non-AP MLD according to an embodiment of the present disclosure. In this embodiment, AP1 and AP2 are affiliated with the NSTR mobile AP MLD, and STA1 and STA2 are affiliated with the non-AP MLD. It should be appreciated that APs of a different number and STAs of a different number can be also applicable.

At S1310, AP1 advertises complete or partial per-link information of links belonging to the NSTR Mobile AP MLD by transmitting a Beacon frame carrying a Basic Multi-Link element with the NSTR Mobile AP MLD Operation Support subfield equal to 1 and the PLNPL Info subfield in the STA Info field for per-STA profile corresponding to each of the links. Optionally, AP1 may also transmit a probe response frame carrying the Basic Multi-Link element and the PLNPL Info subfield to STA1.

At S1320, the non-AP MLD initiates the multi-link setup procedure and STA1 transmits an Association Request frame to AP1. The Association Request frame includes complete profile of STA1 and STA2 to request two links to be setup (one link between AP1 and STA1 as a primary link, and the other link between AP2 and non-AP STA2 as a nonprimary link) and a Basic Multi-Link element that carries the NSTR Mobile AP MLD Operation Support subfield equal to 1 and/or the PLNPL Info subfield in the STA Info field for per-STA profile corresponding to each of the requested links.

At S1330, AP1 transmits an Association Response frame to STA1 to indicate successful multi-link setup. The Association Response frame includes complete profile of AP1, AP2, and a Basic Multi-Link element that indicates the MLD MAC address of the AP MLD. After successful multi-link setup between the non-AP MLD and AP MLD, two links are setup (Link 1 between AP1 and non-AP STA1 as a primary link, and Link 2 between AP2 and non-AP STA2 as a non-primary link).

In an embodiment, in the PLNPL mode, at least one of the second frame and the third frame further indicates that Traffic IDentifiers (TIDs) mapped to the nonprimary link in DL and/or in UL are also mapped to the primary link in DL and/or in UL.

For example, during the multi-link setup procedure, the Association Request frame transmitted by the first STA may carry a TID-To-Link Mapping element for indicating that TIDs mapped to the nonprimary link in DL and/or in UL are also mapped to the primary link in DL and/or in UL. Similarly, the Association Response frame transmitted by the first AP may carry a TID-To-Link Mapping element for indicating that TIDs mapped to the nonprimary link in DL and/or in UL are also mapped to the primary link in DL and/or in UL. This is TID-To-Link mapping negotiation during the multi-link setup procedure.

In an embodiment, after the multi-link setup is successful, the wireless communication method 400 may further include a TID-TO-Link mapping negotiation procedure, as illustrated in FIG. 14.

As shown in FIG. 14, the first AP transmits a fourth frame to the first STA at block 1410, and receives a fifth frame from the first STA at block 1420. For example, the fourth frame may be a TID-To-Link Mapping Request frame, and the fifth frame may be a TID-To-Link Mapping Response frame.

In an example, the fourth frame may include a request for requesting one or more TIDs, which have been mapped to the primary link in DL and/or UL or are also requested to be mapped to the primary link in DL and/or in UL, to be mapped to the nonprimary link in DL and/or in UL, and the fifth frame indicates that the request is accepted.

In another example, the fourth frame may include a request for requesting one or more TIDs, which have not been mapped to the primary link in DL and/or in UL or are not requested to be mapped to the primary link in DL and/or in UL, to be mapped to the nonprimary link in DL and/or in UL, and the fifth frame indicates that the request is rejected In an embodiment, after the multi-link setup is successful, the wireless communication method 400 may further include another TID-TO-Link mapping negotiation procedure, as illustrated in FIG. 15.

As shown in FIG. 15, the first AP receives a fourth frame from the first STA at block 1510, and transmits a fifth frame to the first STA at block 1520. For example, the fourth frame may be a TID-To-Link Mapping Request frame, and the fifth frame may be a TID-To-Link Mapping Response frame.

In an example, the fourth frame may include a request for requesting one or more TIDs, which have been mapped to the primary link in DL and/or UL or are also requested to be mapped to the primary link in DL and/or in UL, to be mapped to the nonprimary link in DL and/or in UL, and the fifth frame indicates that request is accepted.

In another example, the fourth frame may include a request for requesting one or more TIDs, which have not been mapped to the primary link in DL and/or in UL or are not requested to be mapped to the primary link in DL and/or in UL, to be mapped to the nonprimary link in DL and/or in UL, and the fifth frame indicates that the request is rejected.

According to the present disclosure, when operating in PLNPL mode, a non-AP MLD that is associated with an NSTR mobile AP MLD and the NSTR mobile AP MLD shall ensure that TIDs mapped to the nonprimary link in DL and/or in UL are also mapped to the primary link in DL or in UL.

FIG. 16 illustrates two exemplary TID-to-link mapping negotiation procedures for a NSTR Mobile AP MLD according to embodiments of the present disclosure. In this embodiment, two links are setup between the NSTR Mobile AP MLD and a Non-AP MLD, Link 1 between AP1 and non-AP STA1 is designated as a primary link and Link 2 between AP2 and non-AP STA2 is designated as a nonprimary link. This procedure is the same as those illustrated in FIG. 13, and detailed description thereof will be omitted here.

As shown in FIG. 16, one of the two TID-to-link mapping negotiation procedures occurs during multi-link setup, and the other one occurs after the multi-link setup is successful.

For sake of description, it is assumed that all TIDs are mapped to Link 1 and Link 2 in DL and UL after the multi-link setup.

In the multi-link (re) setup, AP1 in the primary link should indicate that TIDs mapped to the nonprimary link in DL and/or in UL are also mapped to the primary link in DL and/or in UL in a TID-To-Link Mapping element carried by the Association Response frame.

Similarly, in the multi-link (re) setup, STA1 should indicate that the TIDs mapped to the nonprimary link in DL and/or in UL are also mapped to the primary link in DL and/or in UL in a TID-To-Link Mapping element carried by the Association Request frame.

In other words, the TID-to-link mapping negotiation procedure in the multi-link setup is performed by exchange of the Association request frame and the Association Response frame between the non-AP MLD and the NSTR Mobile AP MLD.

After the multi-link (re) setup is successful, in the TID-To-Link Mapping negotiation procedure, the requesting MLD, which is one of the non-AP MLD and the NSTR mobile AP MLD, may indicate that TIDs, which have been mapped to the primary link in DL and/or in UL or are also requested to be mapped to the primary link in DL and/or in UL, are requested to be mapped to the nonprimary link in DL and/or in UL in the TID-To-Link Mapping element carried by a TID-To-Link Mapping Request frame. In other words, the requesting MLD transmits the TID-To-Link Mapping Request frame to the requested MLD to request one or more TIDs, which have been mapped to the primary link in DL and/or in UL or are also requested to be mapped to the primary link in DL and/or in UL, to be mapped to the nonprimary link in DL and/or in UL. In this case, the requested MLD, which is the other one of the non-AP MLD and the NSTR mobile AP MLD, may transmit a TID-To-Link Mapping response frame to the requesting MLD to accept the request.

Similarly, after the multi-link (re) setup is successful, in the TID-To-Link Mapping negotiation procedure, the requesting MLD may transmit the TID-To-Link Mapping Request frame to the requested MLD to request one or more TIDs, which have not been mapped to the primary link in DL and/or in UL or are not requested to be mapped to the primary link in DL and/or in UL, to be mapped to the nonprimary link in DL and/or in UL. In this case, the requested MLD may transmit the TID-To-Link Mapping response frame to the requesting MLD to reject the request.

For example, as shown in FIG. 16, the non-AP MLD indicates in the TID-To-Link Mapping element carried by the TID-To-Link Mapping Request frame that TIDs except TID 1 and TID 2 (e.g., any two TIDs, which have not been mapped to the primary link or are not requested to be mapped to the primary link) are requested to be mapped to Link 2 in DL and UL, and then the NSTR AP MLD transmits the TID-To-Link Mapping Response frame to accept the TID-To-Link Mapping Request.

FIG. 17 is a flowchart illustrating a wireless communication method 1700 according to embodiments of the present disclosure. The wireless communication method 1700 can be performed at a first STA affiliated with a non-AP MLD. For example, the wireless communication method 1700 may be applied in the scenario as illustrated in FIG. 2. Then, the first STA may be STA1 and the non-AP MLD may be the non-AP MLD 220.

At block 1710, the first STA receives a first frame from a first AP affiliated with an AP MLD. The first frame indicates that the AP MLD supports a PLNPL mode, in which at least two links belonging to the AP MLD includes a primary link and a nonprimary link, and further indicates a first link and a second link of the at least two links as the primary link and the nonprimary link, respectively.

In an embodiment, the first frame may be a beacon frame or a probe response frame, and in the PLNPL mode, only the first AP transmits the beacon frame or the probe response frame, while a second AP affiliated with the AP MLD does not send any beacon frame or probe response frame.

In an embodiment, in the PLNPL mode, the first frame carries complete or partial profile of the second AP. For example, the complete or partial profile of the second STA may be carried in a Basic Multi-Link element carried in the first frame.

In an embodiment, in the PLNPL mode, a second AP affiliated with the AP MLD (e.g., AP2 as illustrated in FIG. 2) initiates a PPDU transmission to a second STA affiliated with the non-AP MLD (e.g., STA2 as illustrated in FIG. 2) in the nonprimary link only if the first AP in the primary link is also initiating the PPDU transmission as a TXOP holder with the same start time.

In an embodiment, the first frame may include the PLNPL Capabilities subfield indicating capabilities for the PLNPL operation, e.g., as illustrated in FIG. 5.

In an embodiment, the PLNPL Capabilities subfield may include at least one of:

a PLNPL Support subfield indicating support of the PLNPL mode, e.g., as illustrated in FIG. 6;

a Power Save Mode subfield indicating whether power save modes for the first AP and/or a second AP affiliated with the AP MLD are supported, e.g., as defined in Table 2;

a TXOP_DURATION_LIMITATION_FOR_NONPRI-MARY_LINK subfield indicating whether a duration of a TXOP gained by the second AP is only allowed to be equal to or shorter than a duration of a TXOP gained by the first AP, e.g., as defined in Table 1; and a TXOP duration offset subfield indicating a maximum offset allowed between an end of the TXOP gained by the second AP and an end of the TXOP gained by the first AP.

In an embodiment, the first frame may include link identifier information for the primary link and link identifier information for the nonprimary link. For example, the first frame may include the PLNPL Info subfield illustrated in FIGS. 8-11 and the PLNPL Info Present subfield as illustrated in FIG. 7.

In an embodiment, the first frame may further indicate at least one of: support of a UL MU operation for the first AP; and support of a DL MU operation for the first AP, e.g., by the PLNPL Info subfield.

In an embodiment, the AP MLD may be a NSTR mobile AP MLD, and the first frame may further indicate support for a NSTR Mobile AP MLD operation. For example, the first frame may include the NSTR Mobile AP MLD Operation Support subfield as shown in FIG. 12.

In another embodiment, the AP MLD may be a NSTR mobile AP MLD, and the second frame further indicates that the non-AP MLD is capable of operating with the NSTR mobile AP MLD. For example, the second frame may include the NSTR Mobile AP MLD Operation Support subfield as shown in FIG. 12.

Referring back to FIG. 17, as another embodiment, the wireless communication method 1700 may further include steps as illustrated by blocks 1720 and 1730. To be specific, the first STA transmits a second frame to the first AP at block 1720, and receives a third frame from the first AP at block 1730. For example, the second frame may be an Association Request frame, and the third frame may be an Association Response frame.

As an example, the second frame indicates that the non-AP MLD supports the PLNPL mode and is used for requesting the first link to be setup between the first AP and the first STA as the primary link and the second link to be setup between a second AP affiliated with the AP MLD and a second STA affiliated with the non-AP MLD as the nonprimary link, and the third frame indicates successful setup of the first link and/or the second link between the non-AP MLD and the AP MLD. In this example, the second frame may carry complete or partial profile of the second STA.

In an embodiment, when the non-AP MLD supports the PLNPL mode, the second frame carries complete or partial profile of the second STA. For example, the complete or partial profile of the second STA may be carried in a Basic Multi-Link element carried in the second frame, e.g., as illustrated in FIG. 3.

In an embodiment, at least one of the second frame and the third frame may include link identifier information for the primary link and link identifier information for the nonprimary link. For example, at least one of the second frame and the third frame may include the PLNPL Info subfield illustrated in FIGS. 8-11 and the PLNPL Info Present subfield as illustrated in FIG. 7.

In an embodiment, the third frame carries complete profile of the first and second APs. For example, the complete or partial profile of the second STA is carried in a Basic Multi-Link element carried in the third frame, e.g., as illustrated in FIG. 3.

As another example, the second frame indicates that the non-AP MLD supports the PLNPL mode and is used for requesting the first link to be setup between the first AP and the first STA as the primary link and the second link to be setup between a second AP affiliated with the AP MLD and a second STA affiliated with the non-AP MLD as the nonprimary link, and the third frame indicates successful setup of the first link and/or the second link between the non-AP MLD and the AP MLD.

In an embodiment, the second frame further indicates at least one of: support of a UL MU operation for the first STA; and support of a DL MU operation for the first STA. For example, a PLNPL Info subfield contained in a Link Info field of a Basic Multi-Link element carried in the second frame may also indicate such information.

In an embodiment, the third frame further indicates at least one of: support of a UL MU operation for the first AP; and support of a DL MU operation for the first AP. For example, a PLNPL Info subfield contained in a Link Info field of a Basic Multi-Link element carried in the third frame may also indicate such information.

In an embodiment, the second frame may include a PLNPL Capabilities subfield indicating capabilities for the PLNPL operation, which is contained in the Common Info field of the Basic Multi-Link element, as shown in FIG. 5.

In an embodiment, the PLNPL Capabilities subfield includes at least one of:

a PLNPL Support subfield indicating support of the PLNPL mode, e.g., as illustrated in FIG. 6;

a Power Save Mode subfield indicating whether power save modes for the first AP and/or the second AP are supported, e.g., as defined in Table 2;

a TXOP_DURATION_LIMITATION_FOR_NONPRI-MARY_LINK subfield indicating whether a duration of a TXOP gained by the second STA is only allowed to be equal to or shorter than a duration of a TXOP gained by the first STA, e.g., as defined in Table 1; and a TXOP duration offset subfield indicating a maximum offset allowed between an end of the TXOP gained by the second STA and an end of the TXOP gained by the first STA.

In an embodiment, the third frame may include a PLNPL Capabilities subfield indicating capabilities for the PLNPL operation, which is contained in the Common Info field of the Basic Multi-Link element, as shown in FIG. 5.

In an embodiment, the PLNPL Capabilities subfield may include at least one of:

a PLNPL Support subfield indicating support of the PLNPL mode, e.g., as illustrated in FIG. 6;

a Power Save Mode subfield indicating whether power save modes for the first AP and/or the second AP are supported, e.g., as defined in Table 2;

a TXOP_DURATION_LIMITATION_FOR_NONPRIMARY_LINK subfield indicating whether a duration of a TXOP gained by the second AP is only allowed to be equal to or shorter than a duration of a TXOP gained by the first AP, e.g., as defined in Table 1; and a TXOP duration offset subfield indicating a maximum offset allowed between an end of the TXOP gained by the second AP and an end of the TXOP gained by the first AP.

In an embodiment, the AP MLD may be a NSTR mobile AP MLD, and the first frame may further indicate support for a NSTR Mobile AP MLD operation.

For example, the first frame may include a NSTR Mobile AP MLD Operation Support subfield for indicating support for the NSTR Mobile AP MLD operation. This subfield may be contained in the Common Info field of the Basic Multi-Link element, as shown in FIG. 12, which illustrates addition of the NSTR Mobile AP MLD Operation Support subfield in the MLD Capabilities subfield in the Common Info field of the Basic Multi-Link element of FIG. 3 according to an embodiment of the present disclosure. The NSTR Mobile AP MLD Operation Support subfield may be set to 1 to indicate that the AP MLD supports to behave as an NSTR Mobile AP MLD; otherwise it is set to 0.

In another embodiment, the AP MLD may be a NSTR mobile AP MLD, and the second frame further indicates that the non-AP MLD is capable of operating with the NSTR mobile AP MLD.

For example, the second frame may also include a NSTR Mobile AP MLD Operation Support subfield as illustrated in FIG. 12 for indicating that the non-AP MLD is capable of operating with the NSTR mobile AP MLD. The NSTR Mobile AP MLD Operation Support subfield may be set to 1 to indicate that the non-AP MLD is capable of operating with an NSTR Mobile AP MLD with which it is associated, and the operation includes exchanging frames with the NSTR Mobile AP MLD in the primary link and nonprimary link; otherwise it is set to 0.

In an embodiment, in the PLNPL mode, at least one of the second frame and the third frame further indicates that TIDs mapped to the nonprimary link in DL and/or in UL are also mapped to the primary link in DL and/or in UL.

In an embodiment, after the multi-link setup is successful, the wireless communication method 1700 may further include a TID-TO-Link mapping negotiation procedure, as illustrated in FIG. 18.

As shown in FIG. 18, the first STA receives a fourth frame from the first AP at block 1810, and transmits a fifth frame to the first AP at block 1820. For example, the fourth frame may be a TID-To-Link Mapping Request frame, and the fifth frame may be a TID-To-Link Mapping Response frame.

In an example, the fourth frame may include a request for requesting one or more TIDS, which have been mapped to the primary link in DL and/or UL or are also requested to be mapped to the primary link in DL and/or in UL, to be mapped to the nonprimary link in DL and/or in UL, and the fifth frame indicates that the request is accepted.

In another example, the fourth frame may include a request for requesting one or more TIDs, which have not been mapped to the primary link in DL and/or in UL or are not requested to be mapped to the primary link in DL and/or in UL, to be mapped to the nonprimary link in DL and/or in UL, and the fifth frame indicates that the request is rejected In an embodiment, after the multi-link setup is successful, the wireless communication method 1700 may further include another TID-TO-Link mapping negotiation procedure, as illustrated in FIG. 19.

As shown in FIG. 19, the first STA transmits a fourth frame to the first AP at block 1910, and receives a fifth frame from the first AP at block 1920. For example, the fourth frame may be a TID-To-Link Mapping Request frame, and the fifth frame may be a TID-To-Link Mapping Response frame.

In an example, the fourth frame may include a request for requesting one or more TIDs, which have been mapped to the primary link in DL and/or UL or are also requested to be mapped to the primary link in DL and/or in UL, to be mapped to the nonprimary link in DL and/or in UL, and the fifth frame indicates that the request is accepted.

In another example, the fourth frame may include a fourth request for requesting one or more TIDs, which have not been mapped to the primary link in DL and/or in UL or are not requested to be mapped to the primary link in DL and/or in UL, to be mapped to the nonprimary link in DL and/or in UL, and the fifth frame indicates that the fourth request is rejected.

Correspondingly to the wireless communication method 400 as described above, a wireless communication T is provided. FIG. 20 is a block diagram of a wireless communication apparatus 2000 according to an embodiment of the present disclosure. The wireless communication apparatus 2000 can be e.g., an AP affiliated with an AP MLD such as a NSTR Mobile AP MLD as specified in IEEE P802.11be™/D1.2. Taking the scenario as shown in FIG. 2 as an example, the AP may be AP1, and the AP MLD further includes AP2.

As shown in FIG. 20, the wireless communication apparatus 2000 includes: a communication unit 2010 configured to transmit a first frame to a first STAtion (STA) affiliated with a non-AP MLD. The first frame indicates that the AP MLD supports a PLNPL mode, in which at least two links belonging to the AP MLD includes a primary link and a nonprimary link. The first frame further indicates a first link and a second link of the at least two links as the primary link and the nonprimary link, respectively.

In an embodiment, the AP MLD is a NSTR mobile AP MLD, and the first frame further indicates support for a NSTR Mobile AP MLD operation.

In an embodiment, the first frame includes a NSTR Mobile AP MLD Operation Support subfield for indicating the support for the NSTR Mobile AP MLD operation, and the NSTR Mobile AP MLD Operation Support subfield is contained in a Common Info field of a Basic Multi-Link element carried in the first frame.

In an embodiment, the first frame includes a PLNPL Capabilities subfield indicating capabilities for an operation of the PLNPL mode.

In an embodiment, the PLNPL Capabilities subfield includes at least one of:

a PLNPL Support subfield indicating support of the PLNPL mode;

a Power Save Mode subfield indicating whether power save modes for the first AP and/or a second AP affiliated with the AP MLD are supported;

a TXOP_DURATION_LIMITATION_FOR_NONPRI-MARY_LINK subfield indicating whether a duration of a TXOP gained by the second AP is only allowed to be equal to or shorter than a duration of a TXOP gained by the first AP; and a TXOP duration offset subfield indicating a maximum offset allowed between an end of the TXOP gained by the second AP and an end of the TXOP gained by the first AP.

In an embodiment, the PLNPL Capabilities subfield is contained in a Common Info field of a Basic Multi-Link element carried in the first frame.

In an embodiment, the communication unit 2010 is further configured to: receive a second frame from the first STA, the second frame indicating that the non-AP MLD supports the PLNPL mode and being used for requesting the first link to be setup between the first AP and the first STA as the primary link and the second link to be setup between a second AP affiliated with the AP MLD and a second STA affiliated with the non-AP MLD as the nonprimary link; and transmit a third frame to the first STA, the third frame indicating successful setup of the first link and/or the second link between the non-AP MLD and the AP MLD.

In an embodiment, the second frame carries complete or partial profile of the second STA.

In an embodiment, the complete or partial profile of the second STA is carried in a Basic Multi-Link element carried in the second frame.

In an embodiment, the third frame carries complete profile of the first and second APs.

In an embodiment, the complete or partial profile of the second STA is carried in a Basic Multi-Link element carried in the third frame.

In an embodiment, at least one of the second frame and the third frame includes link identifier information for the primary link and link identifier information for the nonprimary link.

In an embodiment, the link identifier information for the primary link and the link identifier information for the nonprimary link are indicated by a PLNPL Info subfield contained in a Link Info field of a Basic Multi-Link element carried in at least one of the second frame and the third frame.

In an embodiment, the communication unit 2010 is further configured to: receive a second frame from the first STA, the second frame indicating that the non-AP MLD does not support the PLNPL mode and being used for initiating a multi-link setup between the non-AP MLD and the AP MLD; and transmit a third frame to the first STA, the third frame indicating successful setup of only the first link between the non-AP MLD and the AP MLD or failure of the multi-link setup.

In an embodiment, the AP MLD is a NSTR mobile AP MLD, and the second frame further indicates that the non-AP MLD is capable of operating with the NSTR mobile AP MLD.

In an embodiment, the second frame includes a NSTR Mobile AP MLD Operation Support subfield for indicating that the non-AP MLD is capable of operating with the NSTR mobile AP MLD, and the NSTR Mobile AP MLD Operation Support subfield is contained in a Common Info field of a Basic Multi-Link element carried in the second frame.

In an embodiment, the second frame further indicates at least one of: support of a UL MU operation for the first STA; and support of a DL MU operation for the first STA.

In an embodiment, the second frame includes a PLNPL Info subfield for indicating at least one of: support of the UL MU operation for the first STA; and support of the DL MU operation for the first STA, and the PLNPL Info subfield is contained in a STA Info field in a Link Info field of a Basic Multi-Link element carried in the second frame.

In an embodiment, the third frame further indicates at least one of: support of a UL MU operation for the first AP; and support of a DL MU operation for the first AP.

In an embodiment, the third frame includes a PLNPL Info subfield for indicating at least one of: support of the UL MU operation for the first AP; and support of the DL MU operation for the first AP, and the PLNPL Info subfield is contained in a STA Info field in a Link Info field of a Basic Multi-Link element carried in the third frame.

In an embodiment, in the PLNPL mode, at least one of the second frame and the third frame further indicates that TIDs mapped to the nonprimary link in DL and/or in UL are also mapped to the primary link in DL and/or in UL.

In an embodiment, the second frame includes a PLNPL Capabilities subfield indicating capabilities for an operation of the PLNPL mode.

In an embodiment, the PLNPL Capabilities subfield includes at least one of: a PLNPL Support subfield indicating support of the PLNPL mode; a Power Save Mode subfield indicating whether power save modes for the first AP and/or the second AP are supported; a TXOP_DURA-TION_LIMITATION_FOR_NONPRIMARY_LINK subfield indicating whether a duration of a TXOP gained by the second STA is only allowed to be equal to or shorter than a duration of a TXOP gained by the first STA; and a TXOP duration offset subfield indicating a maximum offset allowed between an end of the TXOP gained by the second STA and an end of the TXOP gained by the first STA.

In an embodiment, the PLNPL Capabilities subfield is contained in a Common Info field of a Basic Multi-Link element.

In an embodiment, the third frame includes a PLNPL Capabilities subfield indicating capabilities for an operation of the PLNPL mode.

In an embodiment, the PLNPL Capabilities subfield includes at least one of:

a PLNPL Support subfield indicating support of the PLNPL mode;

a Power Save Mode subfield indicating whether power save modes for the first AP and/or a second AP affiliated with the AP MLD are supported;

a TXOP_DURATION_LIMITATION_FOR_NONPRI-MARY_LINK subfield indicating whether a duration of a TXOP gained by the second AP is only allowed to be equal to or shorter than a duration of a TXOP gained by the first AP; and a TXOP duration offset subfield indicating a maximum offset allowed between an end of the TXOP gained by the second AP and an end of the TXOP gained by the first AP.

In an embodiment, the PLNPL Capabilities subfield is contained in a Common Info field of a Basic Multi-Link element carried in the third frame.

In an embodiment, the first frame is a beacon frame or a probe response frame, and in the PLNPL mode, only the first AP transmits the beacon frame or the probe response frame, while a second AP affiliated with the AP MLD does not send any beacon frame or probe response frame.

In an embodiment, in the PLNPL mode, the first frame carries complete or partial profile of a second AP affiliated with the AP MLD.

In an embodiment, the complete or partial profile of the second STA is carried in a Basic Multi-Link element carried in the first frame.

In an embodiment, in the PLNPL mode, a second AP affiliated with the AP MLD initiates a PPDU transmission to a second STA affiliated with the non-AP MLD in the nonprimary link only if the first AP in the primary link is also initiating the PPDU transmission as a TXOP holder with the same start time.

In an embodiment, the first frame includes link identifier information for the primary link and link identifier information for the nonprimary link.

In an embodiment, the first frame includes a PLNPL Info subfield for indicating the link identifier information for the primary link and the link identifier information for the nonprimary link, and the PLNPL Info subfield is contained in a STA Info field in a Link Info field of a Basic Multi-Link element carried in the first frame.

In an embodiment, the first frame further indicates at least one of: support of a UL MU operation for the first AP; and support of a DL MU operation for the first AP.

In an embodiment, the first frame includes a PLNPL Info subfield for indicating at least one of: support of the UL MU operation for the first AP; and support of the DL MU operation for the first AP, and the PLNPL Info subfield is contained in a STA Info field in a Link Info field of a Basic Multi-Link element carried in the first frame.

In an embodiment, the communication unit 2010 is further configured to: transmit a fourth frame to the first STA, the fourth frame including a request for requesting one or more TIDs, which have been mapped to the primary link in DL and/or in UL or are also requested to be mapped to the primary link in DL and/or in UL, to be mapped to the nonprimary link in DL and/or in UL; and receive a fifth frame from the first STA, the fifth frame indicating that the request is accepted.

In an embodiment, the communication unit 2010 is further configured to: transmit a fourth frame to the first STA, the fourth frame including a request for requesting one or more TIDs, which have not been mapped to the primary link in DL and/or in UL or are not requested to be mapped to the primary link in DL and/or in UL, to be mapped to the nonprimary link in DL and/or in UL; and receive a fifth frame from the first STA, the fifth frame indicating that the request is rejected.

In an embodiment, the communication unit 2010 is further configured to: receive a fourth frame from the first STA, the fourth frame including a request for requesting one or more TIDS, which have been mapped to the primary link in DL and/or in UL or are also requested to be mapped to the primary link in DL and/or in UL, to be mapped to the nonprimary link in DL and/or in UL; and transmit a fifth frame to the first STA, the fifth frame indicating that the request is accepted.

In an embodiment, the communication unit 2010 is further configured to: receive a fourth frame from the first STA, the fourth frame including a fourth request for requesting one or more TIDs, which have not been mapped to the primary link in DL and/or in UL or are not requested to be mapped to the primary link in DL and/or in UL, to be mapped to the nonprimary link in DL and/or in UL, to be mapped to the nonprimary link in DL and/or in UL; and transmit a fifth frame to the first STA, the fifth frame indicating that the fourth request is rejected.

In an embodiment, the fourth frame is a TID-TO-Link Mapping Request frame, and the fifth frame is a TID-TO-Link Mapping Response frame.

Figure 21:
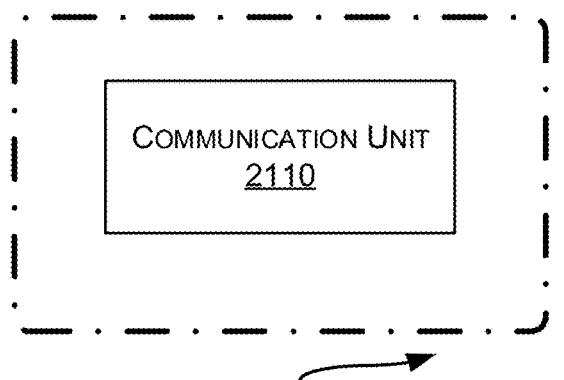
FIG. 21 is a block diagram of a wireless communication apparatus 2100 according to an embodiment of the present disclosure.

Correspondingly to the wireless communication method 1700 as described above, a wireless communication apparatus is provided. FIG. 21 is a block diagram of a wireless communication apparatus 2100 according to an embodiment of the present disclosure. The wireless communication apparatus 2100 can be e.g., a STA affiliated with a non-AP MLD. Taking the scenario as shown in FIG. 2 as an example, the STA may be STA1, and the non-AP MLD further includes STA2.

As shown in FIG. 21, the wireless communication apparatus 2100 includes: a communication unit 2110 configured to receive a first frame from a first AP affiliated with an AP MLD. The first frame indicates that the AP MLD supports a PLNPL mode, in which at least two links belonging to the AP MLD includes a primary link and a nonprimary link. The first frame further indicates a first link and a second link of the at least two links as the primary link and the nonprimary link, respectively.

In an embodiment, the AP MLD is a NSTR mobile AP MLD, and the first frame further indicates support for a NSTR Mobile AP MLD operation.

In an embodiment, the first frame includes a NSTR Mobile AP MLD Operation Support subfield for indicating the support for the NSTR Mobile AP MLD operation, and the NSTR Mobile AP MLD Operation Support subfield is contained in a Common Info field of a Basic Multi-Link element carried in the first frame.

In an embodiment, the first frame includes a PLNPL Capabilities subfield indicating capabilities for an operation of the PLNPL mode.

In an embodiment, the PLNPL Capabilities subfield includes at least one of: a PLNPL Support subfield indicating support of the PLNPL mode; a Power Save Mode subfield indicating whether power save modes for the first AP and/or a second AP affiliated with the AP MLD are supported; a TXOP_DURATION_LIMITATION_FOR_NONPRIMARY_LINK subfield indicating whether a duration of a TXOP gained by the second AP is only allowed to be equal to or shorter than a duration of a TXOP gained by the first AP; and a TXOP duration offset subfield indicating a maximum offset allowed between an end of the TXOP gained by the second AP and an end of the TXOP gained by the first AP.

In an embodiment, the PLNPL Capabilities subfield is contained in a Common Info field of a Basic Multi-Link element carried in the first frame.

In an embodiment, the communication unit 2110 is further configured to: transmit a second frame to the first AP, the second frame indicating that the non-AP MLD is operating in the PLNPL mode and being used for requesting the first link to be setup between the first AP and the first STA as the primary link and the second link to be setup between a second AP affiliated with the AP MLD and a second STA affiliated with the non-AP MLD as the nonprimary link; and receive a third frame from the first AP, the third frame indicating successful setup of the first link and/or the second link between the non-AP MLD and the AP MLD.

In an embodiment, the second frame carries complete or partial profile of the second STA.

In an embodiment, the complete or partial profile of the second STA is carried in a Basic Multi-Link element carried in the second frame.

In an embodiment, the third frame carries complete profile of the first and second APs.

In an embodiment, the complete or partial profile of the second STA is carried in a Basic Multi-Link element carried in the third frame.

In an embodiment, at least one of the second frame and the third frame includes link identifier information for the primary link and link identifier information for the nonprimary link.

In an embodiment, the link identifier information for the primary link and the link identifier information for the nonprimary link are indicated by a PLNPL Info subfield contained in a Link Info field of a Basic Multi-Link element carried in at least one of the second frame and the third frame.

In an embodiment, the communication unit 2110 is further configured to: transmitting a second frame to the first AP, the second frame indicating that the non-AP MLD does not support the PLNPL mode and being used for initiating a multi-link setup between the non-AP MLD and the AP MLD; and receiving a third frame from the first STA, the third frame indicating successful setup of only the first link between the non-AP MLD and the AP MLD or failure of the multi-link setup.

In an embodiment, the AP MLD is a NSTR mobile AP MLD, and the second frame further indicates that the non-AP MLD is capable of operating with the NSTR mobile AP MLD.

In an embodiment, the second frame includes a NSTR Mobile AP MLD Operation Support subfield for indicating that the non-AP MLD is capable of operating with the NSTR mobile AP MLD, and the NSTR Mobile AP MLD Operation Support subfield is contained in a Common Info field of a Basic Multi-Link element carried in the second frame.

In an embodiment, the second frame further indicates at least one of: support of a UL MU operation for the first STA; and support of a DL MU operation for the first STA.

In an embodiment, the second frame includes a PLNPL Info subfield for indicating at least one of: support of the UL MU operation for the first STA; and support of the DL MU operation for the first STA, and the PLNPL Info subfield is contained in a STA Info field in a Link Info field of a Basic Multi-Link element carried in the second frame.

In an embodiment, the third frame further indicates at least one of:

support of a UL MU operation for the first AP; and support of a DL MU operation for the first AP.

In an embodiment, the third frame includes a PLNPL Info subfield for indicating at least one of: support of the UL MU operation for the first AP; and support of the DL MU operation for the first AP, and the PLNPL Info subfield is contained in a STA Info field in a Link Info field of a Basic Multi-Link element carried in the third frame.

In an embodiment, in the PLNPL mode, at least one of the second frame and the third frame further indicates that all TIDs mapped to the nonprimary link in DL and/or in UL are also mapped to the primary link in DL and/or in UL.

In an embodiment, the second frame includes a PLNPL Capabilities subfield indicating capabilities for an operation of the PLNPL mode.

In an embodiment, the PLNPL Capabilities subfield includes at least one of: a PLNPL Support subfield indicating support of the PLNPL mode; a Power Save Mode subfield indicating whether power save modes for the first AP and/or the second AP are supported; a TXOP_DURA-TION_LIMITATION_FOR_NONPRIMARY_LINK subfield indicating whether a duration of a TXOP gained by the second STA is only allowed to be equal to or shorter than a duration of a TXOP gained by the first STA; and a TXOP duration offset subfield indicating a maximum offset allowed between an end of the TXOP gained by the second STA and an end of the TXOP gained by the first STA.

In an embodiment, the PLNPL Capabilities subfield is contained in a Common Info field of a Basic Multi-Link element.

In an embodiment, the third frame includes a PLNPL Capabilities subfield indicating capabilities for an operation of the PLNPL mode.

In an embodiment, the PLNPL Capabilities subfield includes at least one of: a PLNPL Support subfield indicating support of the PLNPL mode; a Power Save Mode subfield indicating whether power save modes for the first AP and/or a second AP affiliated with the AP MLD are supported; a TXOP_DURATION_LIMITATION_FOR_NONPRIMARY_LINK subfield indicating whether a duration of a TXOP gained by the second AP is only allowed to be equal to or shorter than a duration of a TXOP gained by the first AP; and a TXOP duration offset subfield indicating a maximum offset allowed between an end of the TXOP gained by the second AP and an end of the TXOP gained by the first AP.

In an embodiment, the PLNPL Capabilities subfield is contained in a Common Info field of a Basic Multi-Link element carried in the third frame.

In an embodiment, the first frame is a beacon frame or a probe response frame, and in the PLNPL mode, only the first AP transmits the beacon frame or the probe response frame, while a second AP affiliated with the AP MLD does not send any beacon frame or probe response frame.

In an embodiment, in the PLNPL mode, the first frame carries complete or partial profile of a second AP affiliated with the AP MLD.

In an embodiment, the complete or partial profile of the second STA is carried in a Basic Multi-Link element carried in the first frame.

In an embodiment, in the PLNPL mode, a second AP affiliated with the AP MLD initiates a PPDU transmission to a second STA affiliated with the non-AP MLD in the nonprimary link only if the first AP in the primary link is also initiating the PPDU transmission as a TXOP holder with the same start time.

In an embodiment, the first frame includes link identifier information for the primary link and link identifier information for the nonprimary link.

In an embodiment, the first frame includes a PLNPL Info subfield for indicating the link identifier information for the primary link and the link identifier information for the nonprimary link, and the PLNPL Info subfield is contained in a STA Info field in a Link Info field of a Basic Multi-Link element carried in the first frame.

In an embodiment, the first frame further indicates at least one of: support of a UL MU operation for the first AP; and support of a DL MU operation for the first AP.

In an embodiment, the first frame includes a PLNPL Info subfield for indicating at least one of: support of the UL MU operation for the first AP; and support of the DL MU operation for the first AP, and the PLNPL Info subfield is contained in a STA Info field in a Link Info field of a Basic Multi-Link element carried in the first frame.

In an embodiment, the communication unit 2110 is further configured to: receive a fourth frame from the first AP, the fourth frame including a request for requesting one or more TIDs, which have been mapped to the primary link in DL and/or in UL or are also requested to be mapped to the primary link in DL and/or in UL, to be mapped to the nonprimary link in DL and/or in UL; and transmit a fifth frame to the first AP, the fifth frame indicating that the request is accepted.

In an embodiment, the communication unit 2110 is further configured to: receive a fourth frame from the first AP, the fourth frame including a request for requesting one or more TIDs, which have not been mapped to the primary link in DL and/or in UL or are not requested to be mapped to the primary link in DL and/or in UL, to be mapped to the nonprimary link in DL and/or in UL; and transmit a fifth frame to the first AP, the fifth frame indicating that the request is rejected.

In an embodiment, the communication unit 2110 is further configured to: transmit a fourth frame to the first AP, the fourth frame including a request for requesting one or more TIDs, which have been mapped to the primary link in DL and/or in UL or are also requested to be mapped to the primary link in DL and/or in UL, to be mapped to the nonprimary link in DL and/or in UL; and receive a fifth frame from the first AP, the fifth frame indicating that the request is accepted.

In an embodiment, the communication unit 2110 is further configured to: transmit a fourth frame to the first AP, the fourth frame including a fourth request for requesting one or more TIDs, which have not been mapped to the primary link in DL and/or in UL or are not requested to be mapped to the primary link in DL and/or in UL, to be mapped to the nonprimary link in DL and/or in UL; and receive a fifth frame from the first AP, the fifth frame indicating that the fourth request is rejected.

In an embodiment, the fourth frame is a TID-TO-Link Mapping Request frame, and the fifth frame is a TID-TO-Link Mapping Response frame.

Figure 22:
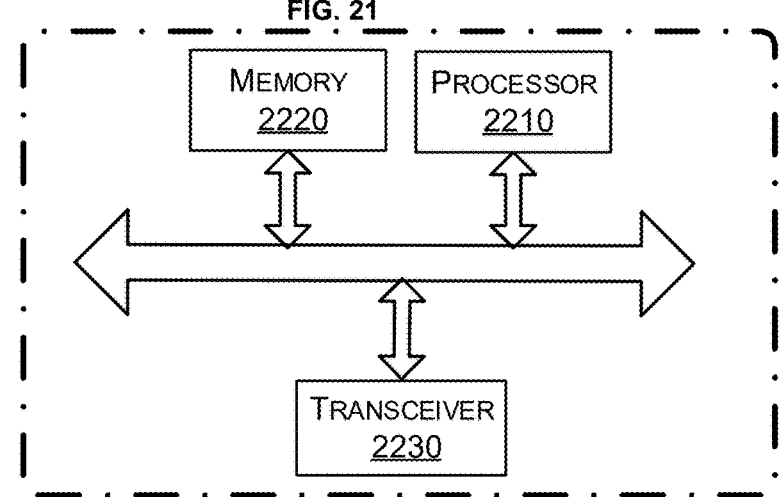
FIG. 22 is a block diagram of a communication device 2200 according to embodiments of the present disclosure.

FIG. 22 is a block diagram of a communication device 2200 according to embodiments of the present disclosure. The communication device 2200 shown in FIG. 22 includes a processor 2210, and the processor 2210 can invoke and run a computer program from a memory to implement the wireless communication method 400 or 1700 according to the embodiments of the present disclosure.

In an embodiment, as shown in FIG. 22, the communication device 2200 may further include a memory 2220. The processor 2210 may invoke and run a computer program from the memory 2220 to implement the wireless communication method 400 or 1700 according to the embodiments of the present disclosure.

The memory 2220 may be a separate device independent of the processor 2210, or may be integrated in the processor 2210.

In an embodiment, as shown in FIG. 22, the communication device 2200 may further include a transceiver 2230, and the processor 2210 may control the transceiver 2230 to communicate with other devices, e.g., transmitting information or data to other devices, or receiving information or data from other devices.

The transceiver 2230 may include a transmitter and a receiver. The transceiver 2230 may further include one or more antennas.

In an embodiment, the communication device 2200 may be an AP affiliated with an AP MLD or a STA affiliated with a non-AP MLD, and the communication device 2200 may implement the corresponding process implemented at the AP or the STA in the method according to the embodiments of the present disclosure.

Figure 23:
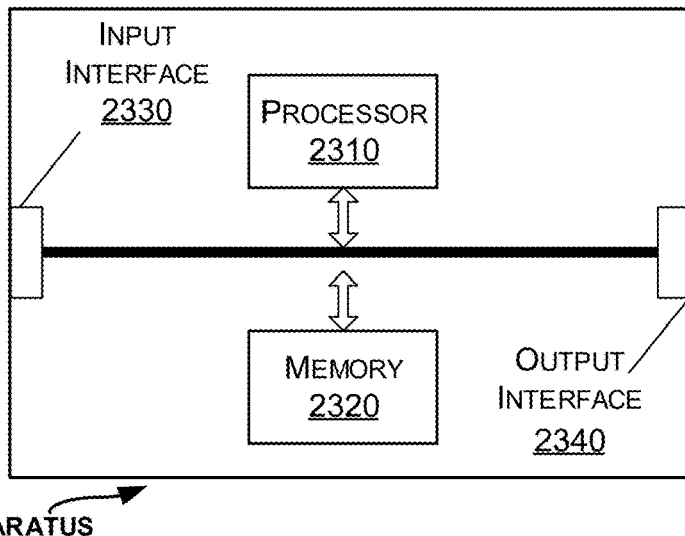
FIG. 23 is a block diagram of an apparatus 2300 according to embodiments of the present disclosure.

FIG. 23 is a block diagram of an apparatus 2300 according to embodiments of the present disclosure. The apparatus 2300 includes a processor 2310, which is configured to invoke and run a computer program from the memory to implement the wireless communication method 400 or 1700 according to the embodiments of the present disclosure.

In an embodiment, as shown in FIG. 23, the apparatus 2300 may further include a memory 2320. The processor 2310 may invoke and run a computer program from the memory 2320 to implement the wireless communication method 400 or 1700 according to the embodiments of the The memory 2320 may be a separate device independent of the processor 2310, or may be integrated in the processor 2310.

In an embodiment, the apparatus 2300 may further include an input interface 2330. The processor 2310 may control the input interface 2330 to communicate with other devices or chips, e.g., obtaining information or data sent by other devices or chips.

In an embodiment, the apparatus 2300 may further include an output interface 2340. The processor 2310 can control the output interface 2340 to communicate with other devices or chips, e.g., outputting information or data to other devices or chips.

In an embodiment, the apparatus 2300 can be applied to an AP affiliate with an AP MLD or a STA affiliate with a non-AP MLD according to the embodiments of the present disclosure, and the apparatus can implement the corresponding process implemented at the AP or the STA in the method according to the embodiments of the present disclosure.

In an embodiment, the apparatus can also be a chip. For example, the apparatus can be a system-level chip or a system-on-chip.

It should be understood that the processor according to the embodiments of the present disclosure may be a single CPU (Central Processing Unit), but could also include two or more processing units. For example, the processor may include general purpose microprocessors; instruction set processors and/or related chips sets and/or special purpose microprocessors such as Application Specific Integrated Circuits (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-Access Memory (RAM), a Read-Only Memory (ROM), or an EEPROM, and the computer program modules described above could in alternative embodiments be distributed on different computer program products in the form of memories.

The embodiments of the present disclosure also provide a computer readable storage medium having a computer program stored thereon.

In an embodiment, the computer readable storage medium can be applied to the first/second AP according to the embodiments of the present disclosure, and the computer program causes a computer to execute the corresponding process implemented by the first/second AP in each method according to the embodiments of the present disclosure.

The embodiments of the present disclosure also provide a computer program product including computer program instructions.

In an embodiment, the computer program product can be applied to the first AP/STA according to the embodiments of the present disclosure, and the computer program instructions cause the computer to perform the corresponding process implemented by the first/second AP in each method according to the embodiments of the present disclosure.

The embodiment of the present disclosure also provides a computer program.

In an embodiment, the computer program can be applied to the first AP/STA according to the embodiments of the present disclosure. When executed by the computer, the computer program causes the computer to perform the corresponding process implemented by the first/second AP in each method according to the embodiments of the present disclosure.

The disclosure has been described above with reference to embodiments thereof. It should be understood that various modifications, alternations and additions can be made by one skilled in the art without departing from the spirits and scope of the disclosure. Therefore, the scope of the disclosure is not limited to the above particular embodiments but only defined by the claims as attached.

The invention claimed is:

1. A wireless communication method, applied in a first station (STA) affiliated with a non-AP Multi-Link Device (MLD), the wireless communication method comprising:
    receiving a first frame from a first Access Point (AP) affiliated with an AP Multi-Link Device (MLD) when the AP MLD sets dot11SoftAPMLDImplemented to true and has one NonSimultaneous Transmit and Receive (NSTR) pair of links with the following restrictions:
        each AP affiliated with a mobile AP MLD is not required to support all Extremely High Throughput (EHT) AP mandatory features;
        support of Multi-User (MU) operation is optional for APs affiliated with a mobile AP MLD;
        support of two or more spatial streams is optional for APs affiliated with a mobile AP MLD;
        only one AP of affiliated APs operating in an NSTR pair of links sends Beacon and Probe Response frames;
        the mobile AP MLD is in a mobile device that is battery powered;
    each AP affiliated to a mobile AP MLD has a different medium access control (MAC) address, the first frame indicating that the AP MLD supports a mode, in which at least two links belonging to the AP MLD comprise a primary link and a nonprimary link, and the first frame further indicating a first link and a second link of the at least two links as the primary link for transmitting Beacon and Probe Response frames and the nonprimary link, respectively; and
    transmitting a fourth frame to the first AP, the fourth frame comprising a request for requesting one or more Traffic Identifiers (TIDs) which have been mapped to the primary link in downlink (DL) and/or in uplink (UL) or are also requested to be mapped to the primary link in DL and/or in UL, to be mapped to the nonprimary link in DL and/or in UL, and receiving a fifth frame from the first AP, the fifth frame indicating that the request is accepted; or
    transmitting a fourth frame to the first AP, the fourth frame comprising a request for requesting one or more Traffic Identifiers (TIDs) which have not been mapped to the primary link in downlink (DL) and/or in uplink (UL) or are not requested to be mapped to the primary link in DL and/or in UL, to be mapped to the nonprimary link in DL and/or in UL, and receiving a fifth frame from the first AP, the fifth frame indicating that the request is rejected.

2. The wireless communication method according to claim 1, wherein the AP MLD is a NonSimultaneous Transmit and Receive (NSTR) mobile AP MLD, and the first frame further indicates support for a NSTR Mobile AP MLD operation.

3. The wireless communication method according to claim 2, wherein the first frame comprises a NSTR Mobile AP MLD Operation Support subfield for indicating the support for the NSTR Mobile AP MLD operation, and the NSTR Mobile AP MLD Operation Support subfield is contained in a Common Info field of a Basic Multi-Link element carried in the first frame.

4. The wireless communication method according to claim 1, further comprising:
    transmitting a second frame to the first AP, the second frame indicating that the non-AP MLD is operating in the mode and being used for requesting the first link to be setup between the first AP and the first STA as the primary link and the second link to be setup between a second AP affiliated with the AP MLD and a second STA affiliated with the non-AP MLD as the nonprimary link; and
    receiving a third frame from the first AP, the third frame indicating successful setup of the first link and/or the second link between the non-AP MLD and the AP MLD.

5. The wireless communication method according to claim 4, wherein in the mode, at least one of the second frame and the third frame further indicates that all Traffic Identifiers (TIDs) mapped to the nonprimary link in downlink (DL) and/or in uplink (UL) are also mapped to the primary link in DL and/or in UL.

6. An Access Point (AP) device affiliated with an AP Multi-Link Device (MLD), comprising:
    a transceiver;
    a memory having a computer program stored thereon; and
    a processor configured to invoke and run the computer program to control the transceiver to:
    when the AP MLD sets dot11SoftAPMLDImplemented to true and has one NonSimultaneous Transmit and Receive (NSTR) pair of links with the following restrictions:
        each AP affiliated with a mobile AP MLD is not required to support all Extremely High Throughput (EHT) AP mandatory features;
        support of Multi-User (MU) operation is optional for APs affiliated with a mobile AP MLD;
        support of two or more spatial streams is optional for APs affiliated with a mobile AP MLD;
        only one AP of affiliated APs operating in an NSTR pair of links sends Beacon and Probe Response frames;
        the mobile AP MLD is in a mobile device that is battery powered;
        each AP affiliated to a mobile AP MLD has a different medium access control (MAC) address,
    transmit a first frame to a first station (STA) affiliated with a non-AP MLD, the first frame indicating that the AP MLD supports a mode, in which at least two links belonging to the AP MLD comprise a primary link and a nonprimary link, and the first frame further indicating a first link and a second link of the at least two links as the primary link for transmitting Beacon and Probe Response frames and the nonprimary link, respectively; and
    receive a fourth frame from the first STA, the fourth frame comprising a request for requesting one or more Traffic Identifiers (TIDs) which have been mapped to the primary link in downlink (DL) and/or in uplink (UL) or are also requested to be mapped to the primary link in DL and/or in UL, to be mapped to the nonprimary link in DL and/or in UL, and transmitting a fifth frame to the first STA, the fifth frame indicating that the request is accepted; or receive a fourth frame from the first STA, the fourth frame comprising a request for requesting one or more Traffic Identifiers (TIDs) which have not been mapped to the primary link in downlink (DL) and/or in uplink (UL) or are not requested to be mapped to the primary link in DL and/or in UL, to be mapped to the nonprimary link in DL and/or in UL, and transmitting a fifth frame to the first STA, the fifth frame indicating that the request is rejected.

7. The AP device according to claim 6, wherein the AP MLD is a NonSimultaneous Transmit and Receive (NSTR) mobile AP MLD, and the first frame further indicates support for a NSTR Mobile AP MLD operation.

8. The AP device according to claim 7, wherein the first frame comprises a NSTR Mobile AP MLD Operation Support subfield for indicating the support for the NSTR Mobile AP MLD operation, and the NSTR Mobile AP MLD Operation Support subfield is contained in a Common Info field of a Basic Multi-Link element carried in the first frame.

9. The AP device according to claim 6, wherein the processor is further configured to control the transceiver to:

receive a second frame from the first STA, the second frame indicating that the non-AP MLD supports the mode and being used for requesting the first link to be setup between the AP device and the first STA as the primary link and the second link to be setup between a second AP affiliated with the AP MLD and a second STA affiliated with the non-AP MLD as the nonprimary link; and transmit a third frame to the first STA, the third frame indicating successful setup of the first link and/or the second link between the non-AP MLD and the AP MLD.

10. The AP device according to claim 9, wherein in the mode, at least one of the second frame and the third frame further indicates that Traffic Identifiers (TIDs) mapped to the nonprimary link in downlink (DL) and/or in uplink (UL) are also mapped to the primary link in DL and/or in UL.

11. A station (STA) device affiliated with a non-AP Multi-Link Device (MLD), comprising:

a transceiver;

a memory having a computer program stored thereon; and a processor configured to invoke and run the computer program to control the transceiver to:

when an AP MLD sets dot11SoftAPMLDImplemented to true and has one NonSimultaneous Transmit and Receive (NSTR) pair of links with the following restrictions:

each AP affiliated with a mobile AP MLD is not required to support all Extremely High Throughput (EHT) AP mandatory features;

support of Multi-User (MU) operation is optional for APs affiliated with a mobile AP MLD;

support of two or more spatial streams is optional for APs affiliated with a mobile AP MLD;

only one AP of affiliated APs operating in an NSTR pair of links sends Beacon and Probe Response frames;

34 the mobile AP MLD is in a mobile device that is battery powered;

each AP affiliated to a mobile AP MLD has a different medium access control (MAC) address, receive a first frame from a first Access Point (AP) affiliated with an AP Multi-Link Device (MLD), the first frame indicating that the AP MLD supports a mode, in which at least two links belonging to the AP MLD comprise a primary link and a nonprimary link, and the first frame further indicating a first link and a second link of the at least two links as the primary link for transmitting Beacon and Probe Response frames and the nonprimary link, respectively; and transmit a fourth frame to the first AP, the fourth frame comprising a request for requesting one or more Traffic Identifiers, TIDs, which have been mapped to the primary link in downlink, DL, and/or in uplink, UL, or are also requested to be mapped to the primary link in DL and/or in UL, to be mapped to the nonprimary link in DL and/or in UL, and receiving a fifth frame from the first AP, the fifth frame indicating that the request is accepted; or transmit a fourth frame to the first AP, the fourth frame comprising a request for requesting one or more Traffic Identifiers, TIDs, which have not been mapped to the primary link in downlink, DL, and/or in uplink, UL, or are not requested to be mapped to the primary link in DL and/or in UL, to be mapped to the nonprimary link in DL and/or in UL, and receiving a fifth frame from the first AP, the fifth frame indicating that the request is rejected.

12. The STA device according to claim 11, wherein the AP MLD is a NonSimultaneous Transmit and Receive (NSTR) mobile AP MLD, and the first frame further indicates support for a NSTR Mobile AP MLD operation.

13. The STA device according to claim 12, wherein the first frame comprises a NSTR Mobile AP MLD Operation Support subfield for indicating the support for the NSTR Mobile AP MLD operation, and the NSTR Mobile AP MLD Operation Support subfield is contained in a Common Info field of a Basic Multi-Link element carried in the first frame.

14. The STA device according to claim 11, wherein the processor is further configured to control the transceiver to:

transmit a second frame to the first AP, the second frame indicating that the non-AP MLD is operating in the mode and being used for requesting the first link to be setup between the first AP and the STA device as the primary link and the second link to be setup between a second AP affiliated with the AP MLD and a second STA affiliated with the non-AP MLD as the nonprimary link; and receive a third frame from the first AP, the third frame indicating successful setup of the first link and/or the second link between the non-AP MLD and the AP MLD.

15. The STA device according to claim 14, wherein in the mode, at least one of the second frame and the third frame further indicates that all Traffic Identifiers (TIDs) mapped to the nonprimary link in downlink (DL) and/or in uplink (UL) are also mapped to the primary link in DL and/or in UL.

* * * * *